(12) United States Patent
Yamaguchi et al.

(10) Patent No.: US 11,989,910 B2
(45) Date of Patent: May 21, 2024

(54) MOVING BODY AND POSITION ESTIMATION METHOD

(71) Applicant: SONY GROUP CORPORATION, Tokyo (JP)

(72) Inventors: Yuya Yamaguchi, Tokyo (JP); Makoto Daniel Tokunaga, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 179 days.

(21) Appl. No.: 17/614,177

(22) PCT Filed: May 22, 2020

(86) PCT No.: PCT/JP2020/020243
§ 371 (c)(1),
(2) Date: Nov. 24, 2021

(87) PCT Pub. No.: WO2020/246261
PCT Pub. Date: Dec. 10, 2020

(65) Prior Publication Data
US 2022/0222851 A1    Jul. 14, 2022

(30) Foreign Application Priority Data

Jun. 5, 2019  (JP) ................. 2019-105206

(51) Int. Cl.
*G06T 7/529* (2017.01)
*G06T 7/593* (2017.01)
(Continued)

(52) U.S. Cl.
CPC ............ *G06T 7/74* (2017.01); *G06T 7/529* (2017.01); *G06T 7/593* (2017.01); *H04N 13/204* (2018.05);
(Continued)

(58) Field of Classification Search
CPC .......... G06T 7/74; G06T 7/529; G06T 7/593; G06T 2207/10032; G06T 2207/30244;
(Continued)

(56) References Cited

U.S. PATENT DOCUMENTS 6,049,625 A    4/2000  Sakamoto
6,130,705 A *  10/2000  Lareau ............... H04N 23/6811
                                                          382/106
(Continued)

FOREIGN PATENT DOCUMENTS

CN    106598063 A    4/2017
CN    107065894 A    8/2017
(Continued)

OTHER PUBLICATIONS

International Search Report and Written Opinion of PCT Application No. PCT/JP2020/020243, dated Jul. 28, 2020, 09 pages of ISRWO.

(Continued)

*Primary Examiner* — Timothy R Newlin
(74) *Attorney, Agent, or Firm* — CHIP LAW GROUP

(57) ABSTRACT

The present disclosure relates to a moving body, a position estimation method, and a program capable of achieving high accuracy of self-position estimation. An imaging control unit sets a zoom parameter of an imaging unit having a zoom lens according to at least any one of an altitude or a moving speed of its own machine, and a self-position estimation unit estimates a self-position on the basis of an image captured by the imaging unit in which the zoom parameter is set. Technology according to the present disclosure can be applied to, for example, a moving body such as a drone.

18 Claims, 25 Drawing Sheets

(51) Int. Cl.
*G06T 7/73* (2017.01)
*H04N 13/204* (2018.01)
*H04N 13/296* (2018.01)
*H04N 23/69* (2023.01)
*G01C 21/16* (2006.01)

(52) U.S. Cl.
CPC ........... *H04N 13/296* (2018.05); *H04N 23/69* (2023.01); *G01C 21/1656* (2020.08); *G06T 2207/10032* (2013.01); *G06T 2207/30244* (2013.01)

(58) Field of Classification Search
CPC .... H04N 13/204; H04N 13/296; H04N 23/69; G01C 21/1656
See application file for complete search history.

(56) References Cited

U.S. PATENT DOCUMENTS

| | | | | |
|---|---|---|---|---|
| 10,642,271 | B1* | 5/2020 | Graber | H04N 23/69 |
| 10,721,404 | B1* | 7/2020 | Battocchi | H04N 23/72 |
| 2004/0005085 | A1* | 1/2004 | Andersen | G08B 17/125 |
| | | | | 382/109 |
| 2005/0021202 | A1* | 1/2005 | Russell | H04B 7/18506 |
| | | | | 348/143 |
| 2010/0157056 | A1* | 6/2010 | Zohar | G01S 13/66 |
| | | | | 348/148 |
| 2011/0109786 | A1* | 5/2011 | Kimura | H04N 5/2628 |
| | | | | 348/335 |
| 2011/0221888 | A1* | 9/2011 | Choi | G06T 5/003 |
| | | | | 348/E5.025 |
| 2012/0127169 | A1* | 5/2012 | Barcay | G06T 19/00 |
| | | | | 345/419 |
| 2013/0242045 | A1* | 9/2013 | Chiaki | H04N 13/133 |
| | | | | 348/E13.064 |
| 2014/0072278 | A1* | 3/2014 | Kramer | H04N 21/47205 |
| | | | | 386/240 |
| 2014/0218484 | A1* | 8/2014 | Iwashita | H04N 13/239 |
| | | | | 348/47 |
| 2014/0316616 | A1* | 10/2014 | Kugelmass | G05D 1/104 |
| | | | | 701/8 |
| 2015/0077521 | A1* | 3/2015 | Borchert | H04N 13/243 |
| | | | | 348/47 |
| 2015/0229848 | A1* | 8/2015 | Aggarwal | H04N 5/272 |
| | | | | 348/240.2 |
| 2015/0332506 | A1* | 11/2015 | Aratani | G06T 7/74 |
| | | | | 345/633 |
| 2016/0112646 | A1* | 4/2016 | Tsunoda | H04N 25/46 |
| | | | | 348/240.2 |
| 2016/0127695 | A1* | 5/2016 | Zhang | H04N 23/695 |
| | | | | 348/143 |
| 2017/0106976 | A1 | 4/2017 | Kuhara | |
| 2017/0217589 | A1* | 8/2017 | Maekawa | H04N 23/66 |
| 2018/0095464 | A1* | 4/2018 | Takayama | B64C 39/024 |
| 2018/0332213 | A1* | 11/2018 | Kucharski | G05D 1/0094 |
| 2019/0295280 | A1* | 9/2019 | DiVerdi | G06F 3/011 |
| 2020/0051279 | A1* | 2/2020 | Nakano | G06T 7/80 |
| 2020/0301445 | A1* | 9/2020 | Jourdan | B64U 30/20 |
| 2023/0239437 | A1* | 7/2023 | Karube | G08B 25/00 |
| | | | | 348/144 |

FOREIGN PATENT DOCUMENTS

| | | |
|---|---|---|
| JP | S6133878 A | 2/1986 |
| JP | 10-122838 A | 5/1998 |
| JP | 2017-056904 A | 3/2017 |
| JP | 2017-138947 A | 8/2017 |
| JP | 2017-144986 A | 8/2017 |
| WO | WO-2017104102 A1 | 6/2017 |

OTHER PUBLICATIONS

Andrew J. Davison, "Real-time simultaneous localisation and mapping with a single camera", Proceedings Ninth IEEE International Conference on Computer Vision, Oct. 13-16, 2003, pp. 1403-1410.

* cited by examiner

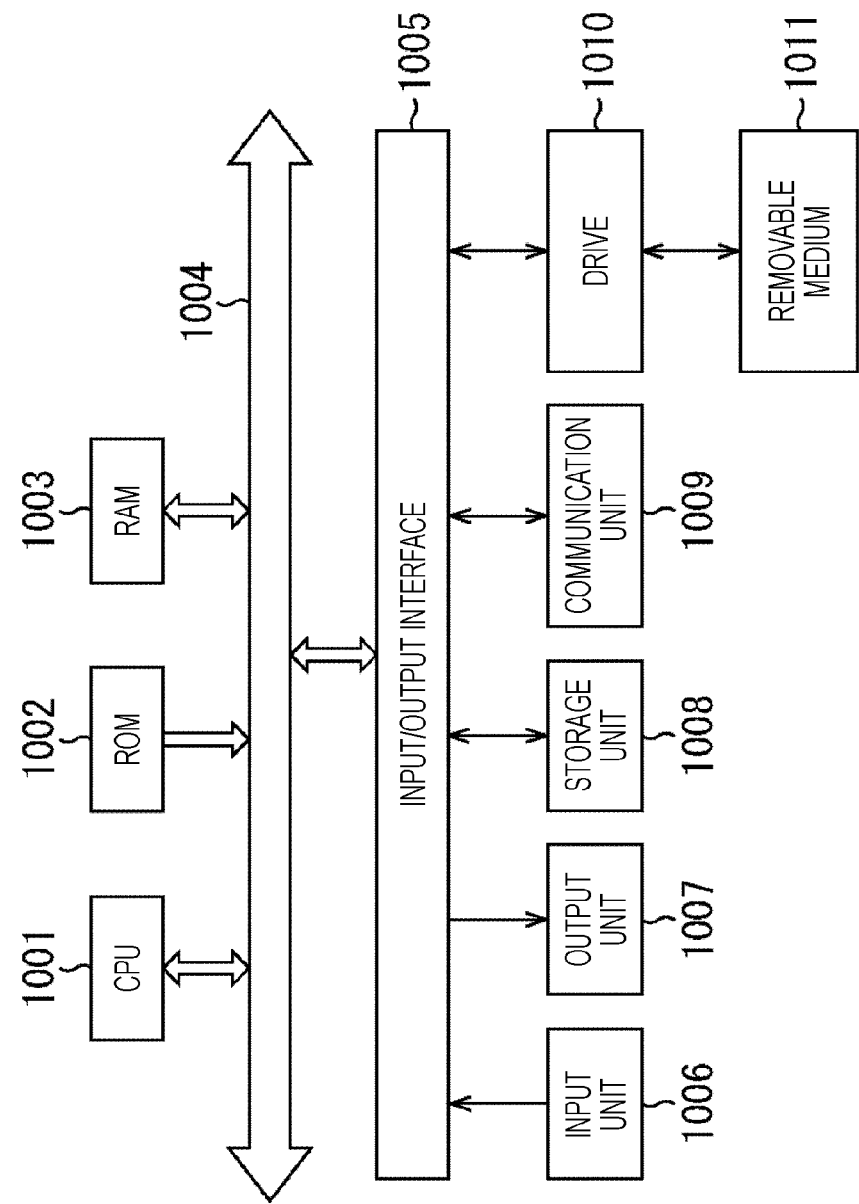

MOVING BODY AND POSITION ESTIMATION METHOD

CROSS REFERENCE TO RELATED APPLICATIONS

This application is a U.S. National Phase of International Patent Application No. PCT/JP2020/020243 filed on May 22, 2020, which claims priority benefit of Japanese Patent Application No. JP 2019-105206 filed in the Japan Patent Office on Jun. 5, 2019. Each of the above-referenced applications is hereby incorporated herein by reference in its entirety.

TECHNICAL FIELD

The present disclosure relates to a moving body, a position estimation method, and a program, and particularly, to a moving body, a position estimation method, and a program capable of achieving high accuracy of self-position estimation.

BACKGROUND ART

In recent years, a technique called Visual simultaneous localization and mapping (SLAM) for estimating a self-position by using an image obtained from a camera and acquiring a surrounding environmental structure (map) in a moving body is known.

For example, Non-Patent Document 1 discloses a SLAM technique using a monocular camera.

Normally, in order to perform self-position estimation, it is necessary to capture a common subject in an angle of view of a camera before and after the camera moves.

CITATION LIST

Patent Document

Non-Patent Document 1: Andrew J. Davison, "Real-Time Simultaneous Localization and Mapping with a Single Camera", Proceedings of the 9th IEEE International Conference on Computer Vision Volume 2, 2003, pp. 1403-1410

SUMMARY OF THE INVENTION

Problems to be Solved by the Invention

Regarding the angle of view of the camera, it is generally known that a viewing angle and spatial resolution (distance accuracy) are in a trade-off relationship.

Unlike a vehicle or the like that moves on the ground, a drone that flies in the air can move in any environment from the vicinity of the ground surface to the sky. Therefore, in a case where self-position estimation is performed in the drone, since a distance to the subject becomes long, the spatial resolution (distance accuracy) becomes insufficient, and accuracy of the self-position estimation decreases.

The present disclosure has been made in view of such a situation, and an object thereof is to realize high accuracy of self-position estimation.

Solutions to Problems

A moving body of the present disclosure is a moving body including: an imaging unit having a zoom lens; an imaging control unit that sets a zoom parameter of the imaging unit according to at least any one of an altitude or a moving speed of its own machine; and a self-position estimation unit that estimates a self-position on the basis of an image captured by the imaging unit in which the zoom parameter is set. The zoom parameter includes a zoom magnification of the zoom lens and a camera parameter of the imaging unit.

A position estimation method of the present disclosure is a position estimation method including: setting a zoom parameter of an imaging unit according to at least any one of an altitude or a moving speed of a moving body including the imaging unit having a zoom lens; and estimating a position of the moving body on the basis of an image captured by the imaging unit in which the zoom parameter is set.

A program of the present disclosure is a program for causing a processor to execute processing of: setting a zoom parameter of an imaging unit according to at least any one of an altitude or a moving speed of a moving body including the imaging unit having a zoom lens; and estimating a position of the moving body on the basis of an image captured by the imaging unit in which the zoom parameter is set.

In the present disclosure, a zoom parameter of an imaging unit is set according to at least any one of an altitude or a moving speed of a moving body including the imaging unit having a zoom lens, and a position of the moving body is estimated on the basis of an image captured by the imaging unit in which the zoom parameter is set.

BRIEF DESCRIPTION OF DRAWINGS

FIG. 26 is a diagram illustrating a configuration example of a computer.

MODE FOR CARRYING OUT THE INVENTION

Figure 1:
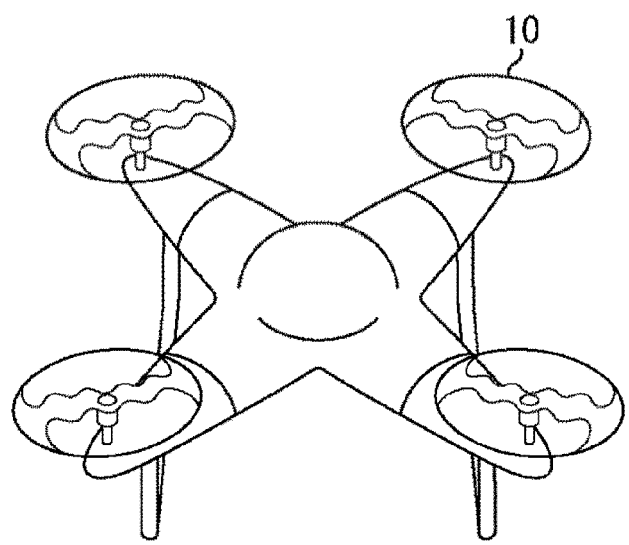
FIG. 1 is a diagram illustrating an appearance of a moving body.

A mode for carrying out the present disclosure (hereinafter, referred to as an embodiment) will be described below. Note that the description will be given in the following order.

1. Overview of Visual SLAM and Technology According to the Present Disclosure
2. Configuration and Movement Control of Moving Body
3. Flow of Zoom Control Processing 1 (Zoom Parameter Setting According to Altitude)
4. Flow of Zoom Control Processing 2 (Zoom Parameter Adjustment According to Moving Speed)
5. Flow of Zoom Control Processing 3 (Zoom Parameter Adjustment According to Disparity)
6. Flow of Zoom Control Processing 4 (Zoom Parameter Adjustment According to Overlap Ratio)
7. Configuration of Moving Body Including Positioning Device
8. Flow of Calibration
9. Configuration of Control System of Moving Body <1. Overview of Visual SLAM and Technology According to the Present Disclosure>

Visual SLAM is a technique for estimating a self-position by using an image obtained from a camera and acquiring a surrounding environmental structure (map).

In a case where a stereo camera is used in Visual SLAM, a distance and a direction to a subject are estimated from parallax of feature points shown in left and right stereo images, and a movement amount of the camera is estimated from temporal variation of the feature points.

In a case where a monocular camera is used in Visual SLAM, a distance and a direction to a subject are estimated from parallax of feature points captured between consecutive frames on the basis of a movement amount of the monocular camera itself, and a movement amount of the camera is estimated from temporal variation of the feature points.

In a case where the monocular camera is used, it is necessary to create parallax on the basis of its own movement amount. However, in order to estimate an initial movement amount, it is necessary to perform initialization such as starting movement while imaging a subject whose size is known or determining the initial movement amount using another distance measuring device.

In both the case where the stereo camera is used and the case where the monocular camera is used, it is necessary to capture a common subject within an angle of view of the camera before and after movement of the camera in order to perform self-position estimation.

Regarding the angle of view of the camera, it is generally known that a viewing angle and spatial resolution (distance accuracy) are in a trade-off relationship.

Unlike a vehicle or the like that moves on the ground, a drone that flies in the air can move in any environment from the vicinity of the ground surface to the sky. Therefore, in a case where self-position estimation is performed in the drone, since a distance to the subject becomes long, the spatial resolution (distance accuracy) becomes insufficient, and accuracy of the self-position estimation decreases.

Therefore, a moving body to which the technology according to the present disclosure is applied is configured to realize high accuracy of self-position estimation even in an environment where it is difficult to define a distance to a subject by appropriately controlling a zoom magnification of a zoom lens according to an altitude.

<2. Configuration and Movement Control of Moving Body>

(Appearance of Moving Body)

FIG. 1 is a diagram illustrating an appearance of a moving body to which the technology according to the present disclosure (the present technology) is applied.

A moving body 10 illustrated in FIG. 1 is configured as a drone. For example, the moving body 10 autonomously moves (autonomously flies) according to a flight route set in advance. In addition to autonomous moving robots such as a drone, a vehicle, a vessel, and a vacuum cleaner that move autonomously, the moving body includes a device or the like that is attached to the moving body and moves. In the following, an example in which the technology according to the present disclosure is applied to a drone flying in the air will be described. However, in addition to the drone, the technology according to the present disclosure can be applied to autonomous moving robots such as an autonomous traveling vehicle moving on land, an autonomous navigation vessel moving on or under water, and an autonomous moving vacuum cleaner moving indoors.

The moving body 10 is equipped with an imaging unit that captures an image for performing self-position estimation.

Figure 2:
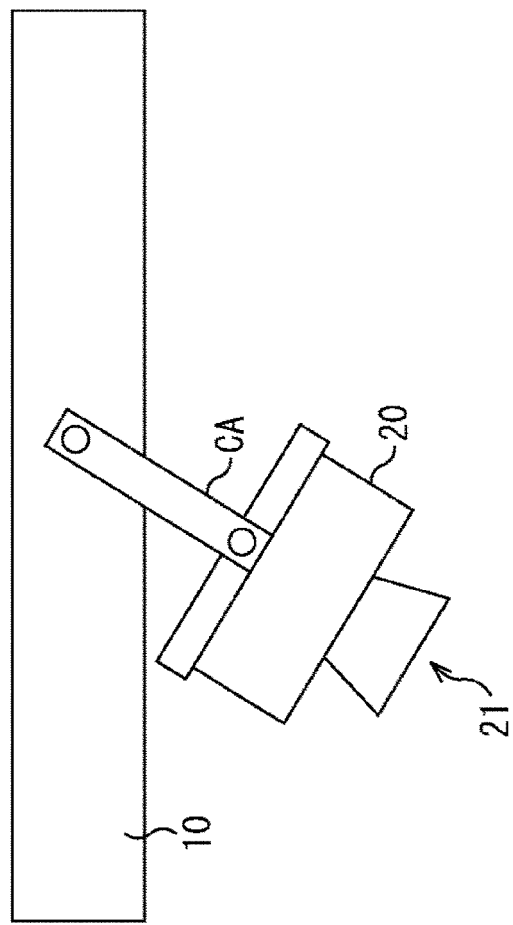
FIG. 2 is a diagram for explaining a configuration of the moving body including an imaging unit.

As illustrated in FIG. 2, an imaging unit 20 mounted on the moving body 10 is connected to a machine body bottom surface of the moving body 10 via an electronically drivable arm CA. The imaging unit 20 includes a mechanism capable of controlling an optical axis thereof in a depression angle direction by a joint of the arm CA. Therefore, the optical axis of the imaging unit 20 is fixed at least between a vertical direction (depression angle 90°) and a horizontal direction (depression angle 0°).

The imaging unit 20 includes a zoom lens 21. Although details will be described later, the zoom lens 21 has a zoom magnification controlled according to an altitude of moving body 10. The imaging unit 20 may include a monocular camera or a stereo camera.

Figure 3:
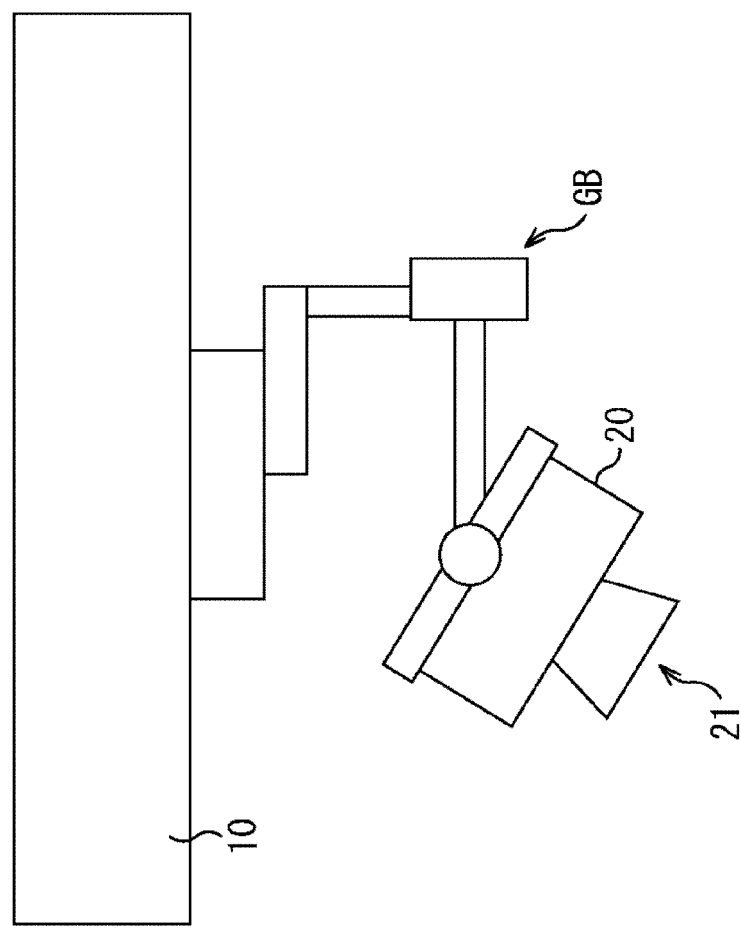
FIG. 3 is a diagram for explaining a configuration of the imaging unit having a gimbal structure.

Furthermore, as illustrated in FIG. 3, the imaging unit 20 may be connected to the machine body bottom surface of the moving body 10 via an electronically drivable gimbal GB. In an example of FIG. 3, the gimbal GB has three rotation axes, and the imaging unit 20 has a configuration capable of controlling the optical axis thereof in three directions of a depression angle, an azimuth angle, and an inclination angle by the gimbal GB. The rotation axis of the gimbal GB may be limited to any of three axes as necessary.

With the configuration in which the imaging unit 20 is connected via the gimbal GB, a posture of the imaging unit 20 can be kept constant even in a case where a machine body of the moving body 10 is inclined.

Note that a general drone is sometimes equipped with an aerial camera connected via a gimbal. In a case where this aerial camera is mounted on the moving body 10 of the present technology, the imaging unit 20 may be rigidly connected to the aerial camera.

(Configuration Blocks of Moving Body)

Figure 4:
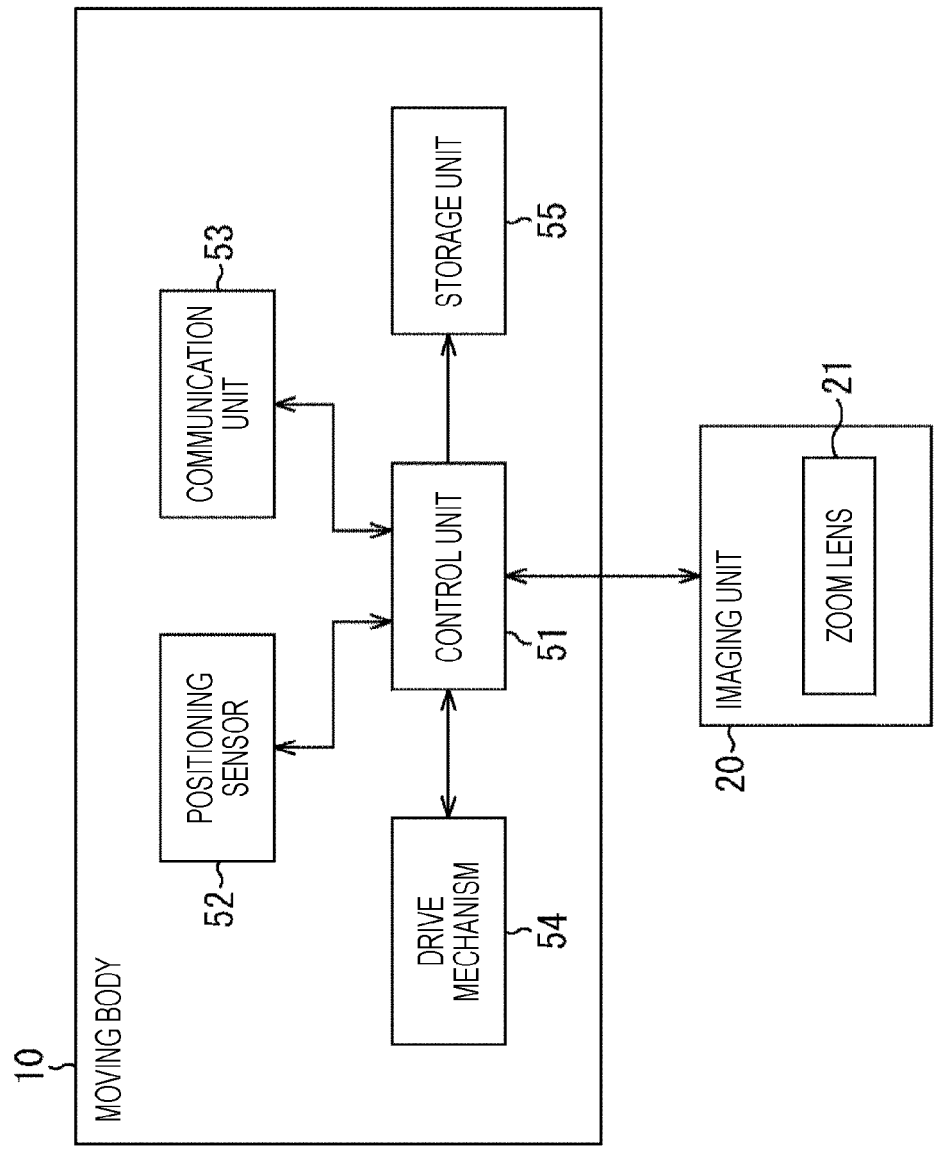
FIG. 4 is a block diagram illustrating a configuration example of the moving body.

FIG. 4 is a block diagram showing a configuration example of the moving body 10.

The moving body 10 includes a control unit 51, a positioning sensor 52, a communication unit 53, a drive mechanism 54, and a storage unit 55.

The control unit 51 includes a processor such as a central processing unit (CPU), a memory, and the like, and controls the positioning sensor 52, the communication unit 53, the drive mechanism 54, and the storage unit 55 by executing a predetermined program.

The positioning sensor 52 may be any sensor capable of acquiring a position of its own machine (the moving body 10), and is configured as, for example, a single focus camera, various positioning devices, or the like. Furthermore, the positioning sensor 52 may include sonar, radar, LiDER, or the like. Positioning data collected by the positioning sensor 52 is used, for example, for correction of a self-position of the moving body 10. The positioning sensor 52 may not necessarily be provided.

The communication unit 53 includes a network interface or the like, and performs wireless or wired communication with a controller for controlling the moving body 10 and any other device. For example, the communication unit 53 may directly communicate with a device to be communicated with, or may perform network communication via a base station or a repeater for Wi-Fi (registered trademark), 4G, 5G, or the like. Furthermore, the communication unit 53 receives global positioning system (GPS) information transmitted from a GPS satellite.

The drive mechanism 54 is a mechanism for moving the moving body 10. In this example, the moving body 10 is configured as a drone, and the drive mechanism 54 includes a motor, a propeller, and the like as a flight mechanism.

The storage unit 55 includes a non-volatile memory such as a flash memory, and stores various types of information according to control of the control unit 51. For example, the storage unit 55 stores an environmental structure (map) created by Visual SLAM, an image captured in the past, and a depth (three-dimensional coordinates) of a feature point on the image in association with self-position information.

(Functional Configuration Blocks of Control Unit)

Figure 5:
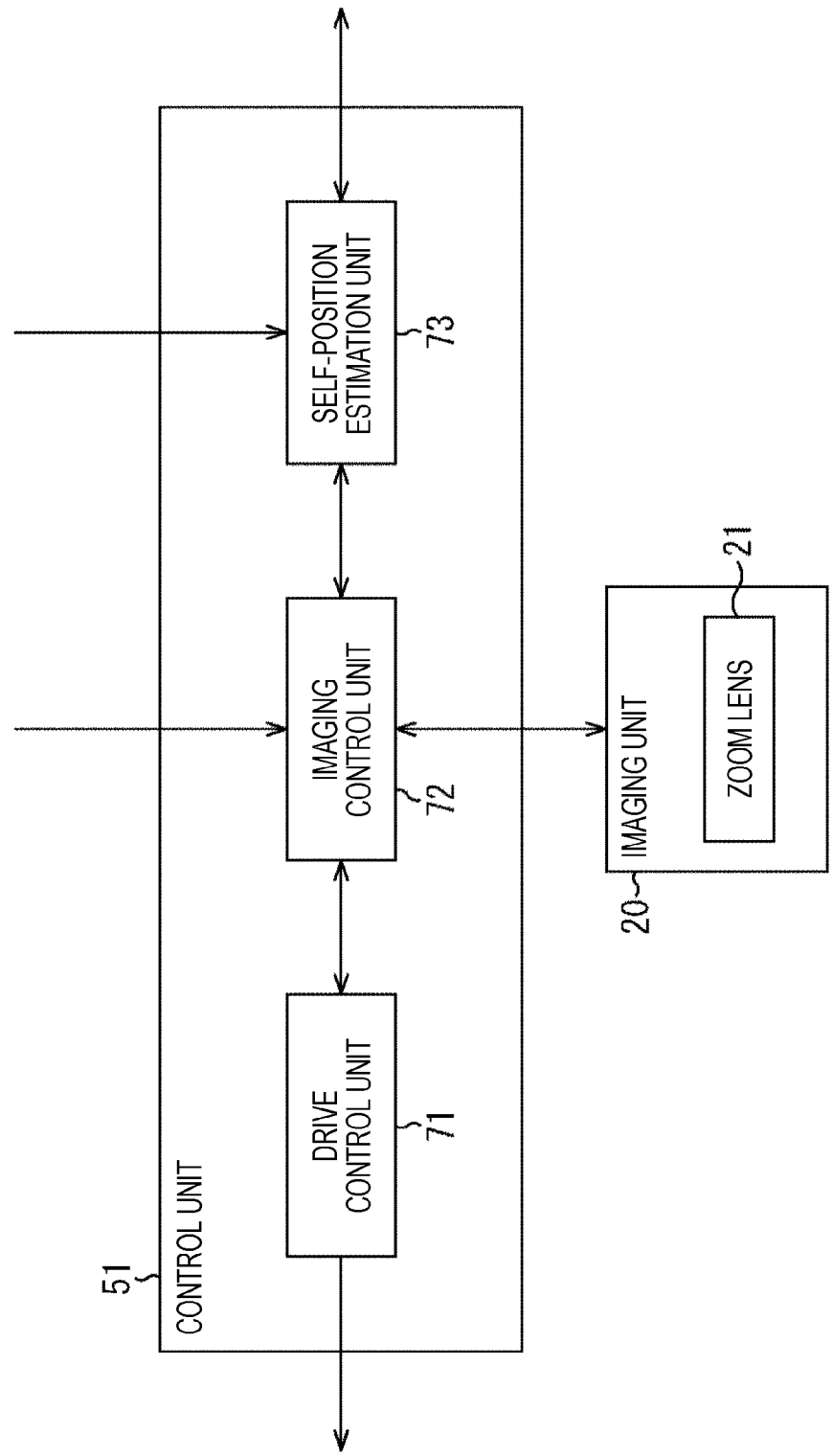
FIG. 5 is a block diagram illustrating a functional configuration example of a control unit.

FIG. 5 is a block diagram showing a functional configuration example of the control unit 51.

Functional blocks of the control unit 51 illustrated in FIG. 5 are realized by execution of a predetermined program by a processor constituting the control unit 51.

The control unit 51 includes a drive control unit 71, an imaging control unit 72, and a self-position estimation unit 73.

The drive control unit 71 controls movement of the moving body 10 by controlling the drive mechanism 54.

The imaging control unit 72 controls the imaging unit 20 including the zoom lens 21. An image captured by the imaging unit 20 is supplied to the self-position estimation unit 73.

Furthermore, the imaging control unit 72 sets a zoom parameter of the imaging unit 20 according to an altitude of the moving body 10. The zoom parameter includes a zoom magnification of the zoom lens 21 and a camera parameter of the imaging unit 20. The altitude of the moving body 10 may be acquired from a self-position estimation result of the self-position estimation unit 73 or may be acquired from positioning data from the positioning sensor 52.

The self-position estimation unit 73 estimates a self-position by Visual SLAM on the basis of the image from the imaging unit 20. Furthermore, the self-position estimation unit 73 may estimate the self-position on the basis of the GPS information received by the communication unit 53. The self-position information indicating the estimated self-position is stored in the storage unit 55 in association with the environmental structure (map) created by Visual SLAM, the image captured in the past, and the depth (three-dimensional coordinates) of the feature point on the image.

(Configuration Blocks of Imaging Unit)

Figure 6:
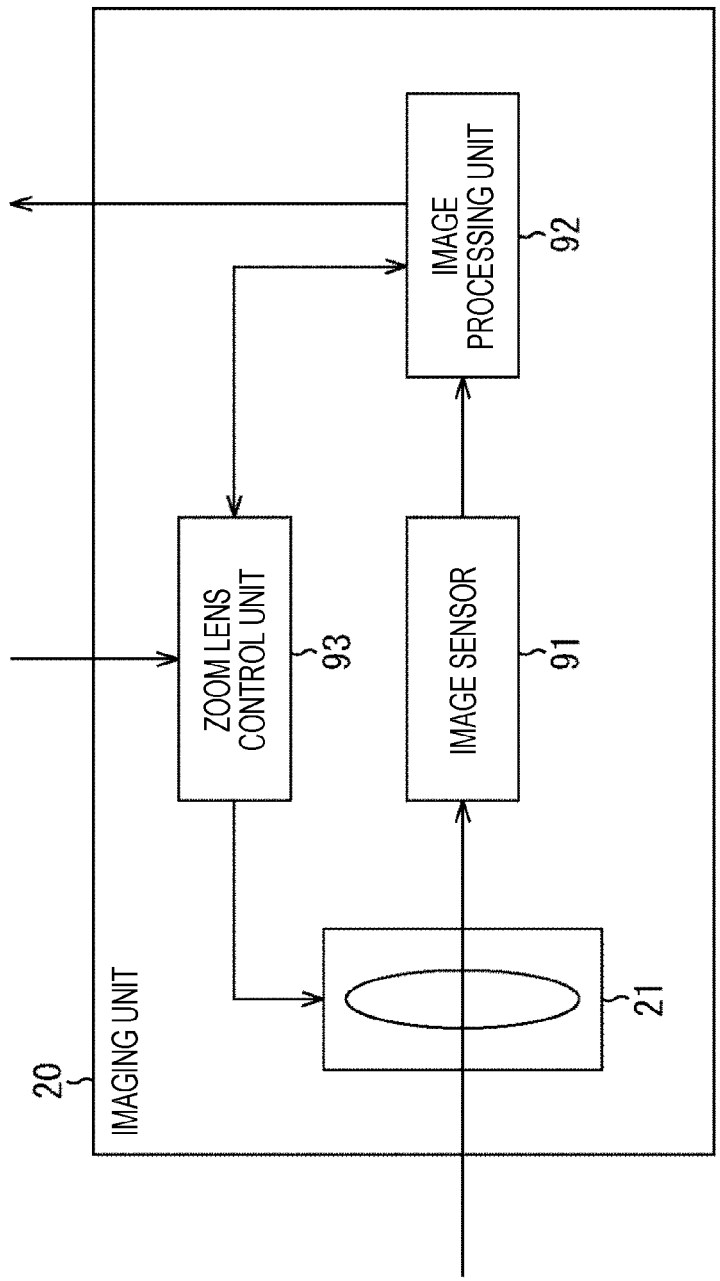
FIG. 6 is a block diagram illustrating a detailed configuration example of the imaging unit.

FIG. 6 is a block diagram illustrating a detailed configuration example of the imaging unit 20.

The imaging unit 20 illustrated in FIG. 6 includes an image sensor 91, an image processing unit 92, and a zoom lens control unit 93 in addition to the zoom lens 21.

The image sensor 91 includes, for example, a complementary metal oxide semiconductor (CMOS) image sensor. The image sensor 91 captures incident light (image light) from a subject incident through the zoom lens 21, converts a light amount of the incident light formed on an imaging surface into an electric signal, and outputs the electric signal to the image processing unit 92 as an image signal.

The image processing unit 92 performs image correction processing such as defect correction, aberration correction, and noise reduction on the image signal from the image sensor 91. Moreover, the image processing unit 92 controls the zoom lens control unit 93 to perform automatic exposure (AE) processing for performing exposure control and contrast AF processing for controlling focus of the zoom lens 21.

The zoom lens control unit 93 controls the zoom lens 21 on the basis of the zoom parameter set by the imaging control unit 72.

Specifically, the zoom lens control unit 93 controls a servo that drives the zoom lens 21 by converting the zoom magnification of the zoom parameter into a drive control value of the zoom lens 21. In other words, it can also be said that the zoom parameter includes the drive control value of the zoom lens 21.

Note that the camera parameter of the zoom parameter is also supplied to an aberration correction circuit included in the image processing unit 92, and aberration correction corresponding to the zoom magnification is performed. In other words, it can also be said that the zoom magnification is set to a desired magnification by the camera parameter.

(Flow of Movement Control)

Figure 7:
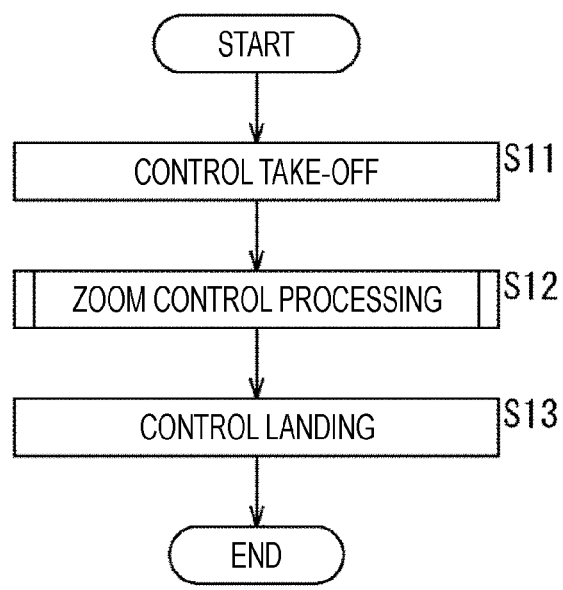
FIG. 7 is a flowchart for explaining a flow of movement control of the moving body.

FIG. 7 is a flowchart for explaining a flow of movement control of the moving body 10.

In step S11, the drive control unit 71 controls the drive mechanism 54 to control take-off, that is, start of movement (flight) of the moving body 10.

In step S12, the imaging control unit 72 performs zoom control processing of setting a zoom parameter of the imaging unit 20.

In step S13, the drive control unit 71 controls the drive mechanism 54 to control landing, that is, end of the movement (flight) of the moving body 10.

Note that the self-position estimation unit 73 always performs self-position estimation processing of estimating the self-position by Visual SLAM on the basis of the image captured by the imaging unit 20 in which the zoom parameter is set.

As described above, the moving body 10 performs self-position estimation while flying in the air.

A flow of the zoom control processing in step S12 will be described below.

<3. Flow of Zoom Control Processing 1>

Figure 8:
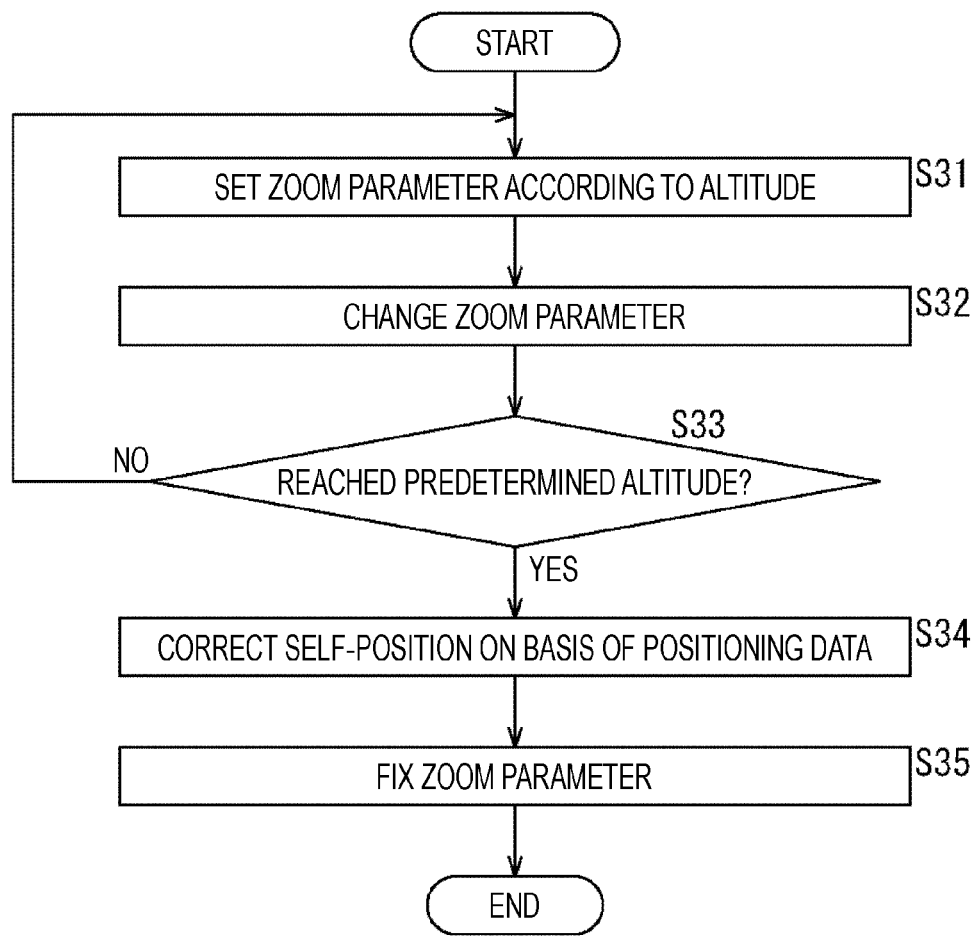
FIG. 8 is a flowchart for explaining a flow of zoom control processing.

FIG. 8 is a flowchart for explaining zoom control processing of setting a zoom parameter in accordance with an altitude.

In step S31, the imaging control unit 72 sets a zoom parameter according to an altitude of the moving body 10. The zoom parameter is a parameter for determining a zoom magnification (eventually, a focal length, an angle of view, a wide end/a tele end) of the zoom lens 21. The storage unit 55 stores a lookup table (LUT) in which values of the zoom parameter corresponding to the altitude are arranged, and the imaging control unit 72 sets the zoom parameter according to the altitude by referring to the LUT.

Figure 9:
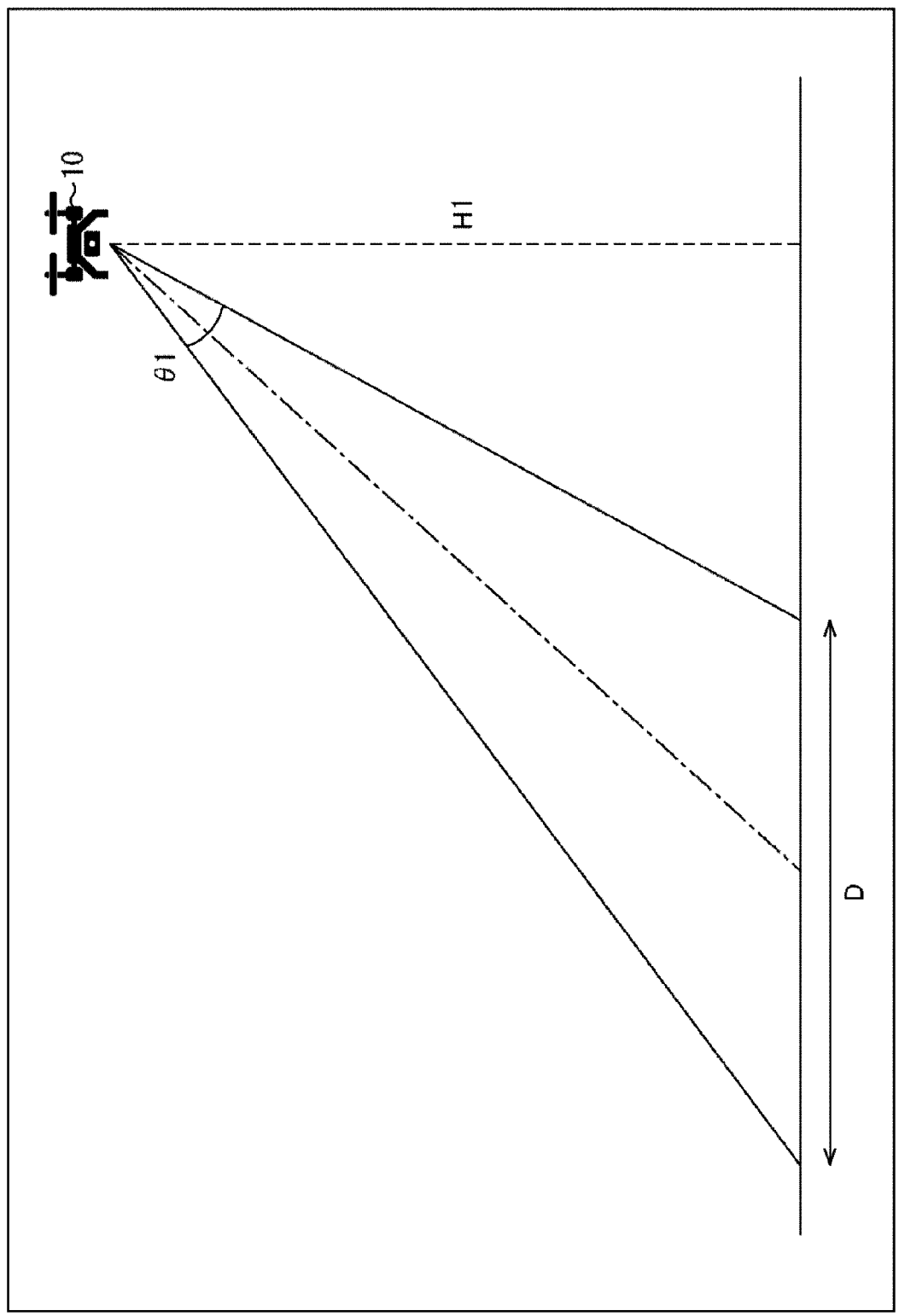
FIG. 9 is a diagram for explaining an altitude and a viewing angle of the moving body.

For example, as illustrated in FIG. 9, in a case where the moving body 10 flies at a high altitude H1, the zoom parameter is set such that a viewing angle becomes a viewing angle θ1 at which a ground surface of an area D is imaged.

Figure 10:
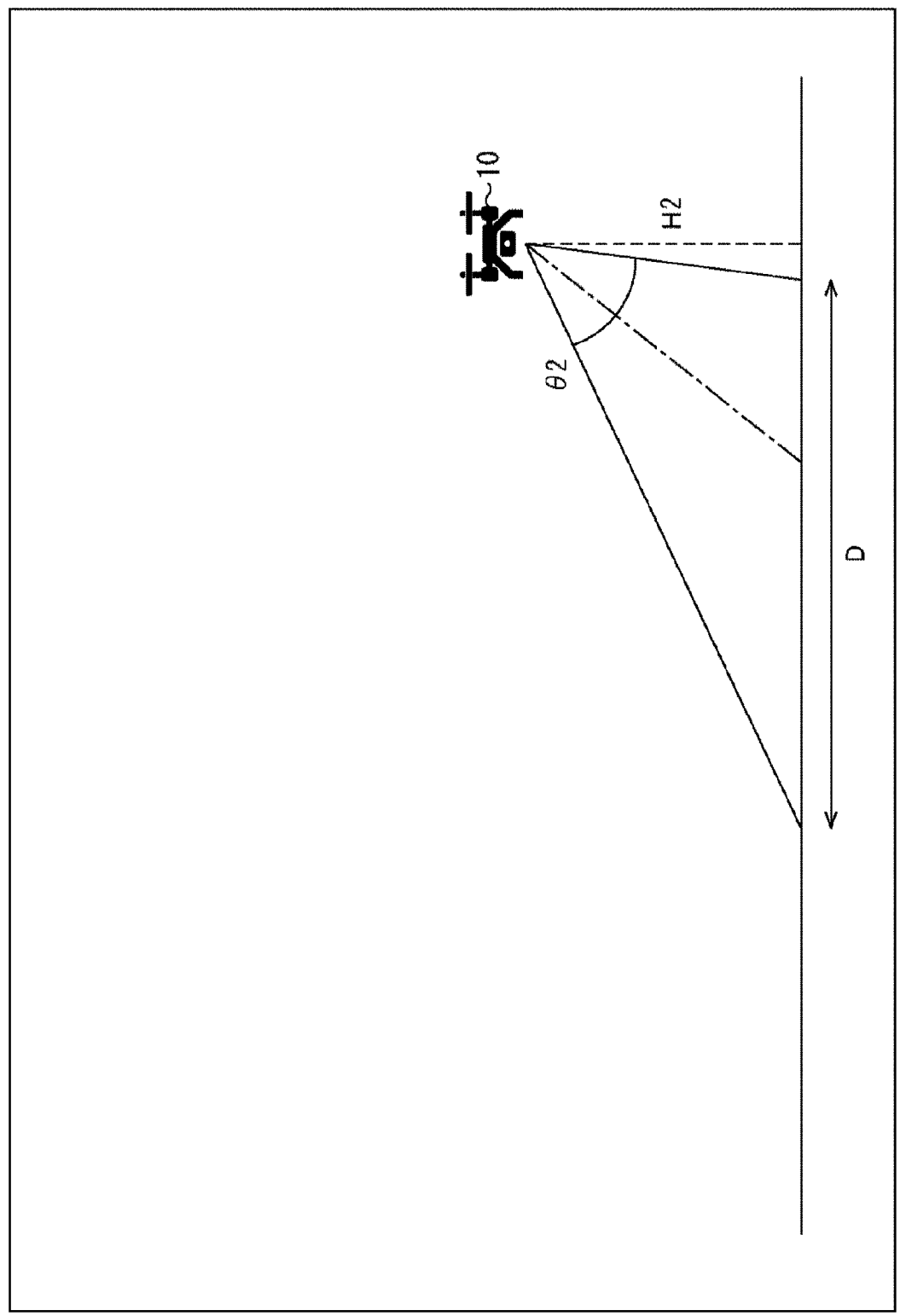
FIG. 10 is a diagram for explaining an altitude and a viewing angle of the moving body.

On the other hand, as illustrated in FIG. 10, in a case where the moving body 10 flies at a low altitude H2, the zoom parameter is set such that the viewing angle becomes a viewing angle θ2 (θ2>θ1) at which the ground surface having the same area D as in FIG. 9 is imaged.

In this manner, the imaging control unit 72 sets the zoom parameter such that the viewing angle decreases as the altitude of the moving body 10 increases.

The altitude of the moving body 10 may be determined on the basis of a self-position estimation result by the self-position estimation unit 73, or may be determined on the basis of positioning data collected by the positioning sensor 52.

In step S32, the imaging control unit 72 changes the zoom parameter so that the zoom parameter becomes a set value by controlling the zoom lens 21.

In step S33, the imaging control unit 72 determines whether or not the altitude of the moving body 10 has become a predetermined altitude. The predetermined altitude may be an altitude automatically set in view of meteorological conditions such as weather and wind speed, or may be an altitude determined by a preset route plan.

Until it is determined in step S33 that the altitude of the moving body 10 has become the predetermined altitude, the processing in steps S31 and S32, that is, the setting of the zoom parameter according to the altitude and the control of the value thereof are repeated. Then, if it is determined in step S33 that the altitude of the moving body 10 has become the predetermined altitude, the processing proceeds to step S34.

In step S34, the self-position estimation unit 73 corrects the estimated self-position on the basis of the positioning data collected by the positioning sensor 52.

For example, the self-position estimation unit 73 registers a pair of an image and position information in the storage unit 55 in advance as a map, and corrects the self-position by using position information corresponding to an image similar to the image captured by the imaging unit 20. Moreover, not only the pair of image and position information but also a depth (three-dimensional information) of a feature point appearing in the image may be registered. In this case, the self-position estimation unit 73 can derive a correspondence relationship (movement amount) between the registered image and the currently captured image, and can correct the self-position with higher accuracy by using the movement amount and the registered position information.

Furthermore, the self-position estimation unit 73 may correct the self-position using the GPS information received by the communication unit 53. Moreover, the self-position estimation unit 73 may obtain the self-position by transmitting a machine body ID of the moving body 10 and a captured image to an external server such as a control tower and inquiring a position of its own machine.

In step S35, the imaging control unit 72 fixes the zoom parameter. Therefore, the zoom magnification of the zoom lens 21 is set to an appropriate zoom magnification.

According to the above processing, the zoom magnification is controlled according to the altitude of the moving body 10, so that a trade-off between a viewing angle and spatial resolution is resolved. Therefore, even under an environment where it is difficult to define a distance to a subject, it is possible to realize high accuracy of self-position estimation.

For example, a drone equipped with only a single focus camera cannot even estimate its own position in the sky of 10 m to 15 m at most, but a drone to which the present technology is applied can also estimate its own position in the sky of 100 m to 200 m.

(Details of Zoom Parameter)

The zoom magnification of the zoom lens 21 is set to a desired magnification by adjusting a drive control value of the servo that drives the zoom lens 21 and changing a camera parameter of the imaging unit 20.

The camera parameter of the imaging unit 20 includes an internal parameter including an optical center, a focal length, and a distortion coefficient of the zoom lens 21, and an external parameter including translation and rotation between a main body of the moving body 10 and the imaging unit 20. Moreover, in a case where the imaging unit 20 includes a stereo camera, the camera parameter of the imaging unit 20 includes an external parameter including translation and rotation between left and right cameras.

It is difficult to accurately set the zoom magnification during control of the zoom lens 21 in synchronization with the image due to mechanical backlash of a lens barrel portion of the zoom lens 21, a system delay related to zoom mechanism control, and the like. Therefore, it is necessary to acquire in advance a correspondence relationship between the drive control value of the zoom lens 21 and the camera parameter as illustrated in FIG. 11 by calibration in a factory or the like.

Figure 11:
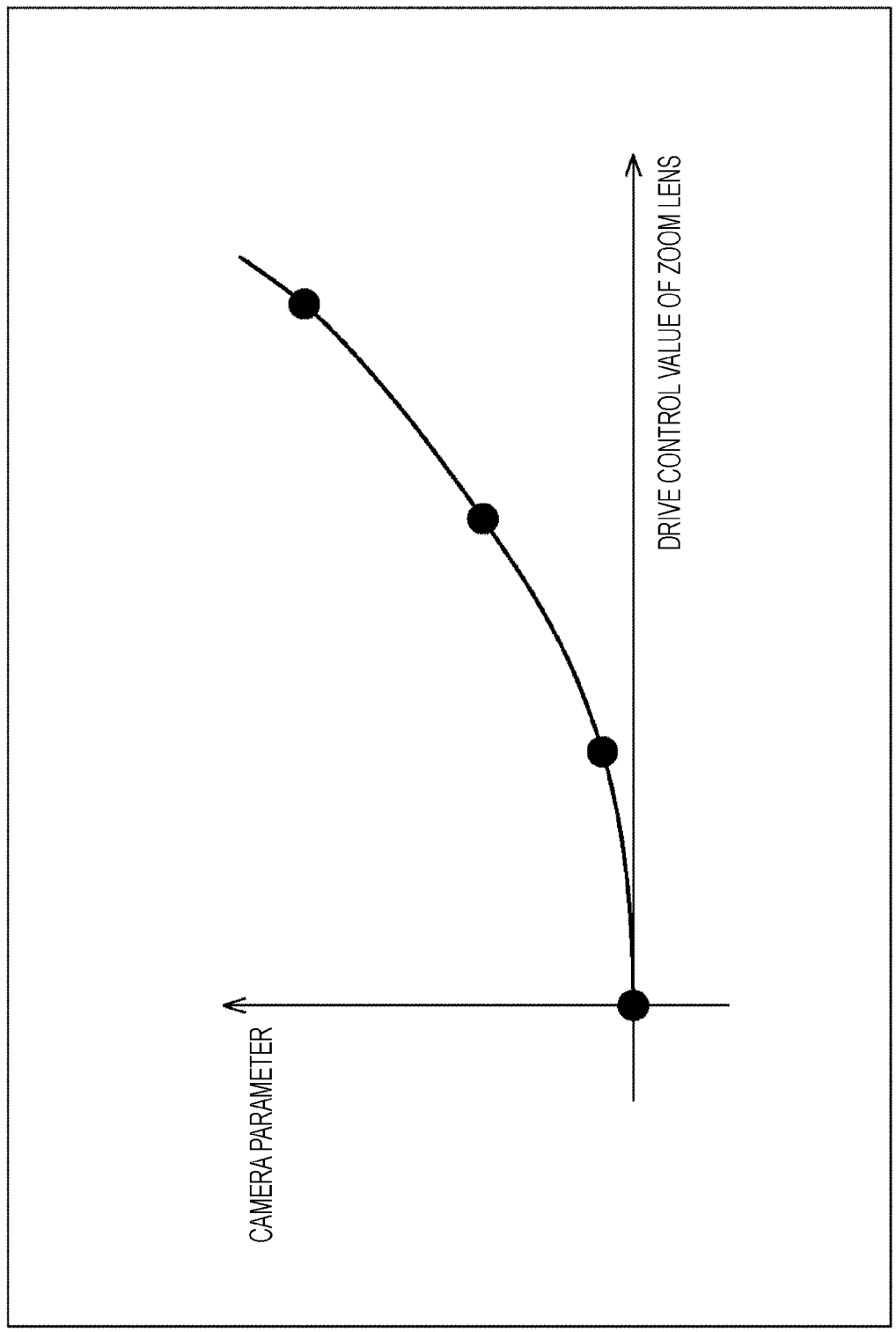
FIG. 11 is a graph illustrating a relationship between a drive control value of a zoom lens and a camera parameter.

In the zoom control processing described above, the drive control value of the zoom lens 21 is changed on the basis of the correspondence relationship as illustrated in FIG. 11 so that an image with a desired zoom magnification can be obtained even during the control of the zoom lens 21.

At this time, if the drive control value of the zoom lens 21 is changed at high speed, there is a possibility that a motion blur occurs in a subject. Therefore, it is desirable to change the drive control value of the zoom lens 21 at a speed at which the motion blur does not occur in the subject.

Furthermore, in the correspondence relationship between the drive control value of the zoom lens 21 and the camera parameter, it is not easy to acquire camera parameters corresponding to all adjustable drive control values of the zoom lens 21. Therefore, camera parameters corresponding to drive control values of a limited number of zoom lenses 21 may be acquired, and a value between the acquired camera parameters may be obtained by interpolation.

The camera parameter of the imaging unit 20 is used for self-position estimation.

Specifically, when the self-position estimation is performed, distortion correction or the like needs to be performed as preprocessing. Therefore, when the self-position estimation is performed, distortion correction is performed on the basis of an internal parameter (distortion coefficient) corresponding to a set drive control value of the zoom lens 21.

Furthermore, in Visual SLAM, a position and a posture of the imaging unit 20 are obtained from a relationship between three-dimensional coordinates and two-dimensional coordinates on the image.

The three-dimensional coordinates are obtained by back projecting a depth obtained from parallax and two-dimensional coordinates of a feature point using the internal parameter (the optical center and the focal length of the zoom lens 21) in a reference frame f(t). The two-dimensional coordinates are obtained by detecting a feature point corresponding to the reference frame f(t) in a current frame f(t+1).

As described above, the internal parameter is also used when the three-dimensional coordinates are obtained in Visual SLAM.

Furthermore, the external parameter between the main body of the moving body 10 and the imaging unit 20 is particularly used for self-position estimation in a case where the moving body 10 adopts a configuration in which a positioning device is mounted in addition to the imaging unit 20. The configuration of the moving body 10 on which the positioning device is mounted will be described later.

<4. Flow of Zoom Control Processing 2>

Meanwhile, in the zoom control processing described above, the zoom parameter is set according to the altitude, but the zoom parameter may be further adjusted according to a moving speed of the moving body 10.

Figure 12:
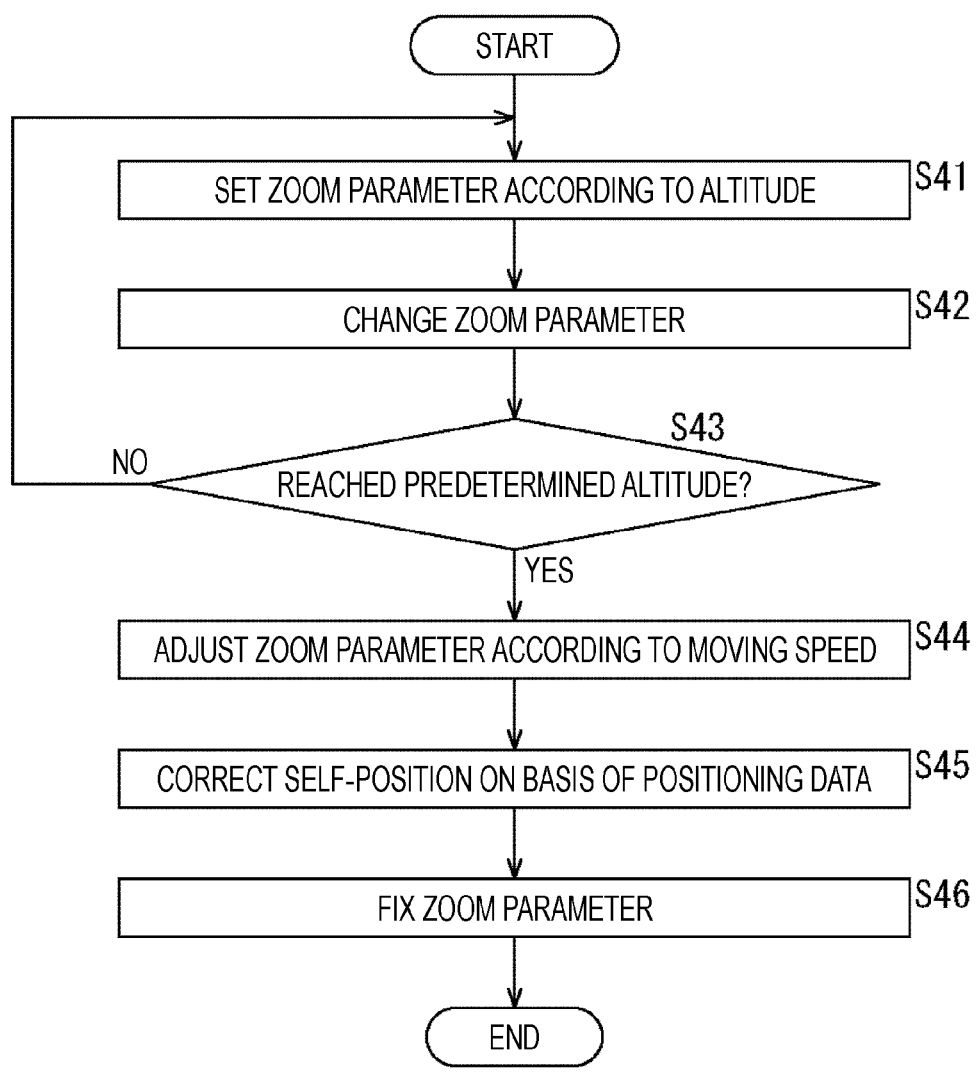
FIG. 12 is a flowchart for explaining a flow of zoom control processing.

FIG. 12 is a flowchart for explaining zoom control processing of adjusting a zoom parameter in accordance with a moving speed.

Note that since processing of steps S41 to S43, S45, S46 in the flowchart of FIG. 12 is similar to the processing of steps S31 to S35 in the flowchart of FIG. 8, description thereof will be omitted.

In other words, if it is determined in step S43 that the altitude of the moving body 10 has become the predetermined altitude, the imaging control unit 72 adjusts a zoom parameter according to a moving speed by controlling the zoom lens 21 in step S44. The moving speed here is a maximum speed automatically set in view of meteorological conditions such as weather and wind speed, or a maximum speed determined by a preset route plan.

Figures 13A, 13B:
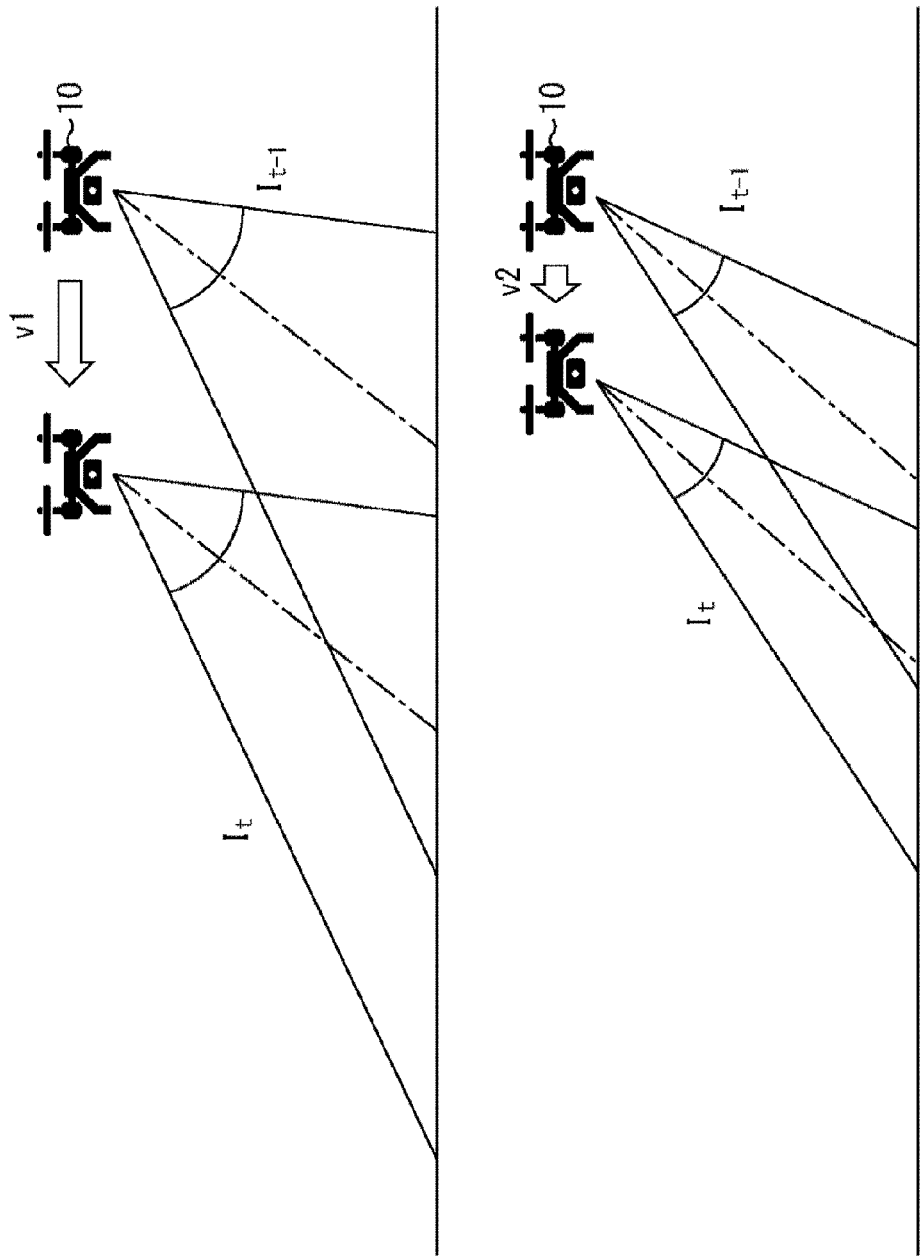
FIGS. 13A and 13B are diagrams for explaining a moving speed and a viewing angle of the moving body.

For example, as illustrated in FIG. 13A, in a case where the moving body 10 moves in a direction parallel to the ground surface at a relatively high moving speed v1, the zoom parameter is adjusted so as to increase the viewing angle. Therefore, a portion overlapping a subject of a frame It−1 at time t−1 and a subject of a frame It at time t can be formed.

On the other hand, as illustrated in FIG. 13B, in a case where the moving body 10 moves in a direction parallel to the ground surface at a relatively low moving speed v2, the zoom parameter is adjusted so as to decrease the viewing angle. As described above, in a case where the moving speed is not so high, even if the viewing angle is small, a portion overlapping the subject of the frame It−1 at the time t−1 and the subject of the frame It at the time t can be formed.

In this manner, the imaging control unit 72 adjusts the zoom parameter so that the viewing angle increases as the moving speed of the moving body 10 increases.

Therefore, even in a case where the moving body 10 moves at a high speed, it is possible to follow the subject between the frames. Accordingly, it is possible to maintain accuracy of self-position estimation.

In the processing of FIG. 11, the zoom parameter is adjusted according to the maximum speed of the moving body 10. However, an actual moving speed may be detected during movement of the moving body 10, and the zoom parameter may be adaptively adjusted according to the moving speed.

Note that, when the moving body 10 moves at an increased speed, the machine body of the moving body 10 may tilt. In a case where the imaging unit 20 is connected via the gimbal GB, the gimbal GB is driven to cancel the tilt of the machine body of the moving body 10, and the position and posture of the imaging unit 20 may be controlled such that the imaging unit 20 maintains a constant direction with respect to the ground surface.

Furthermore, in the processing of FIG. 11, the zoom parameter is adjusted according to both the altitude and the moving speed of the moving body 10, but the zoom parameter may be adjusted according to any one of the altitude or the moving speed of the moving body 10.

<5. Flow of Zoom Control Processing 3>

The zoom parameter may be adjusted according to disparity of images captured by the imaging unit 20.

Figure 14:
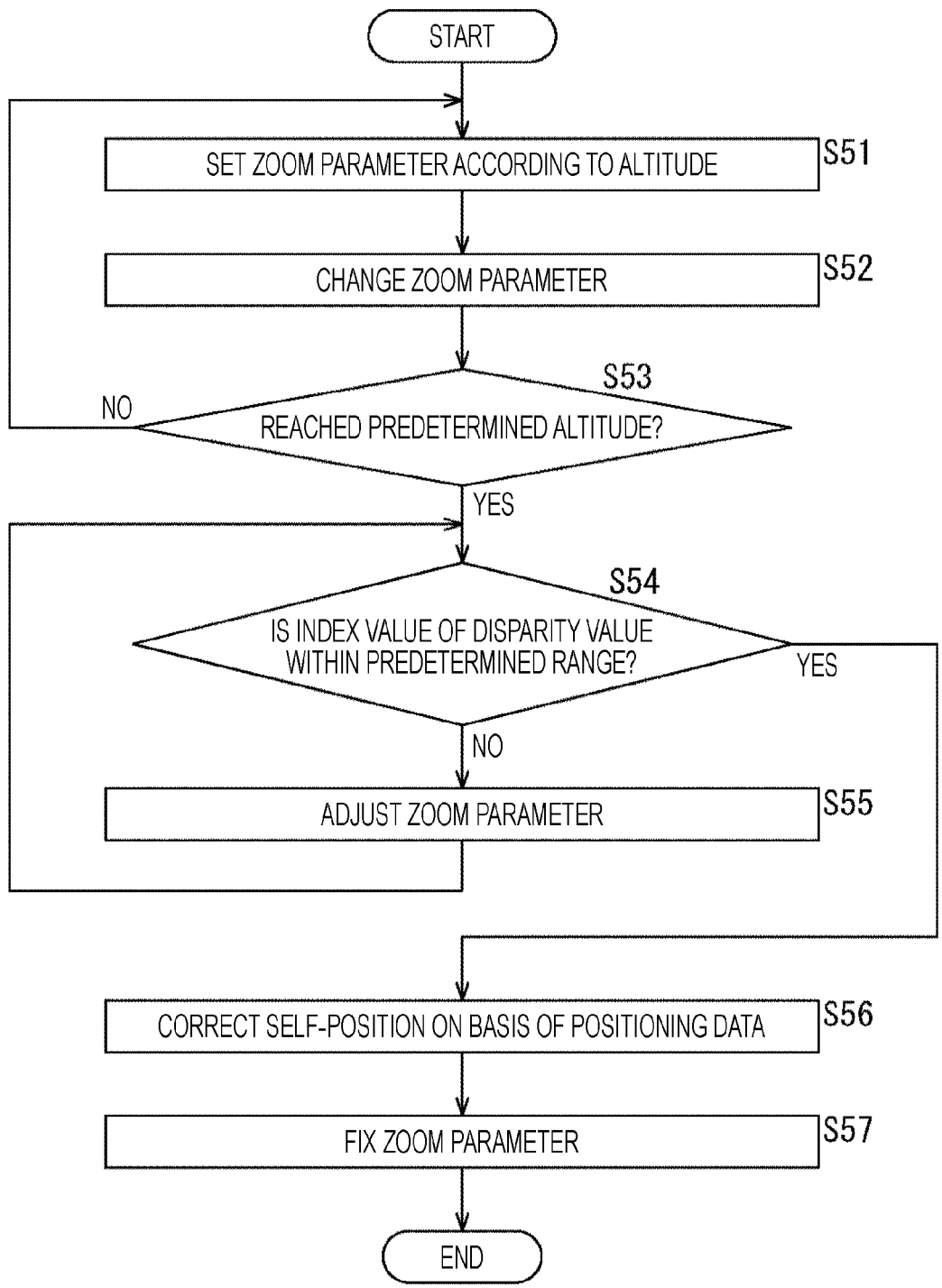
FIG. 14 is a flowchart for explaining a flow of zoom control processing.

FIG. 14 is a flowchart for explaining zoom control processing of adjusting a zoom parameter in accordance with disparity of images.

Note that since processing of steps S51 to S53, S56, S57 in the flowchart of FIG. 14 is similar to the processing of steps S31 to S35 in the flowchart of FIG. 8, description thereof will be omitted.

In other words, in step S54, the imaging control unit 72 determines whether or not an index value of disparity of a feature point on an image captured by the imaging unit 20 is a value within a predetermined range.

In Visual SLAM, it is important to accurately obtain a depth (depth) of the feature point on the image, but there is a correlation between the disparity and depth resolution for the feature point.

Specifically, as an angle of a zoom lens widens, disparity of a distant feature point decreases, and depth resolution lowers. For example, if the disparity is 0.5 pix or less, for example, depth is buried in noise of an image, and accurate positioning cannot be performed.

On the other hand, if the disparity increases, processing cost for performing a feature point matching search increases.

Therefore, first, the imaging control unit 72 obtains disparity of feature points of an entire image.

Figure 15A:
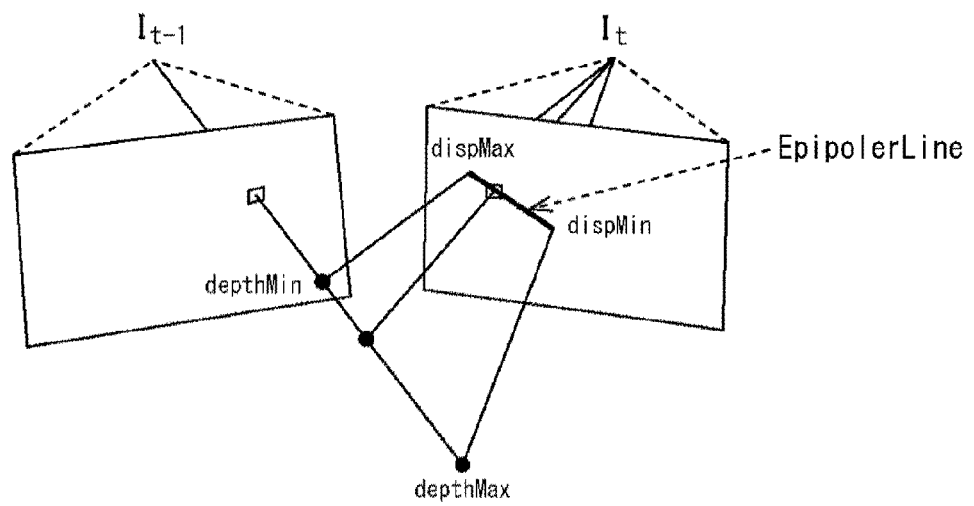
FIGS. 15A and 15B are diagrams for explaining how to obtain disparity.

In a case where the imaging unit 20 includes a monocular camera, as illustrated in FIG. 15A, the disparity of the feature point is obtained by searching for a point corresponding to a feature point in a frame It−1 at time t−1 on an epipolar line in frame It at time t.

Figure 15B:
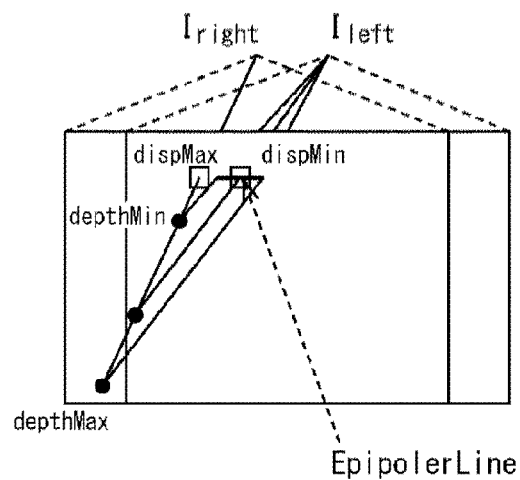

In a case where the imaging unit 20 includes a stereo camera, as illustrated in FIG. 15B, the disparity of the feature point is obtained by searching for a point corresponding to a feature point in a right eye image Iright of a stereo image on an epipolar line in a left eye image Ileft thereof.

Then, the imaging control unit 72 determines whether or not an average value of the disparity of the feature points of the entire image is the value within the predetermined range.

In a case where it is not determined that the average value of the disparity of the feature points of the entire image is the value within the predetermined range, the processing proceeds to step S55, and the imaging control unit 72 adjusts the zoom parameter (viewing angle) such that the average value of the disparity of the feature points of the entire image falls within the value within the predetermined range. Thereafter, the processing returns to step S54, and step S55 is repeated until it is determined that the average value of the disparity of the feature points of the entire image is the value within the predetermined range.

Note that, without being limited to the average value of the disparity of the feature points of the entire image, the viewing angle may be controlled such that a representative value of the disparity of the feature points of the entire image falls within a predetermined range. Furthermore, the representative value of the disparity may be disparity of a feature point stably detected in the image, or may be disparity of a feature point in a region in a central portion of a screen. Moreover, the representative value of the disparity may be obtained by weighting each feature point of the image and calculating a weighted average thereof.

Then, if it is determined that the average value of the disparity of the feature points of the entire image is the value within the predetermined range, step S55 is skipped, and the processing proceeds to step S56.

In this manner, the imaging control unit 72 further adjusts the zoom parameter according to the index value of the disparity of the feature point on the image captured by the imaging unit 20.

Therefore, since the depth of the feature point on the image can be obtained with high accuracy, accuracy of self-position estimation can be maintained.

Note that, in the processing of FIGS. 13A and 13B, the zoom parameter is adjusted on the basis of the index value of the disparity after the altitude change of the moving body 10. However, the zoom parameter may be adaptively adjusted according to an index value of disparity obtained during movement of the moving body 10. Of course, the zoom parameter may be adjusted on the basis of the index value of the disparity after the zoom parameter is adjusted not only in accordance with the altitude of the moving body 10 but also in accordance with at least any one of the altitude or the moving speed thereof.

<6. Flow of Zoom Control Processing 4>

The zoom parameter may be adjusted according to an overlap ratio between frames of an image captured by the imaging unit 20.

Figure 16:
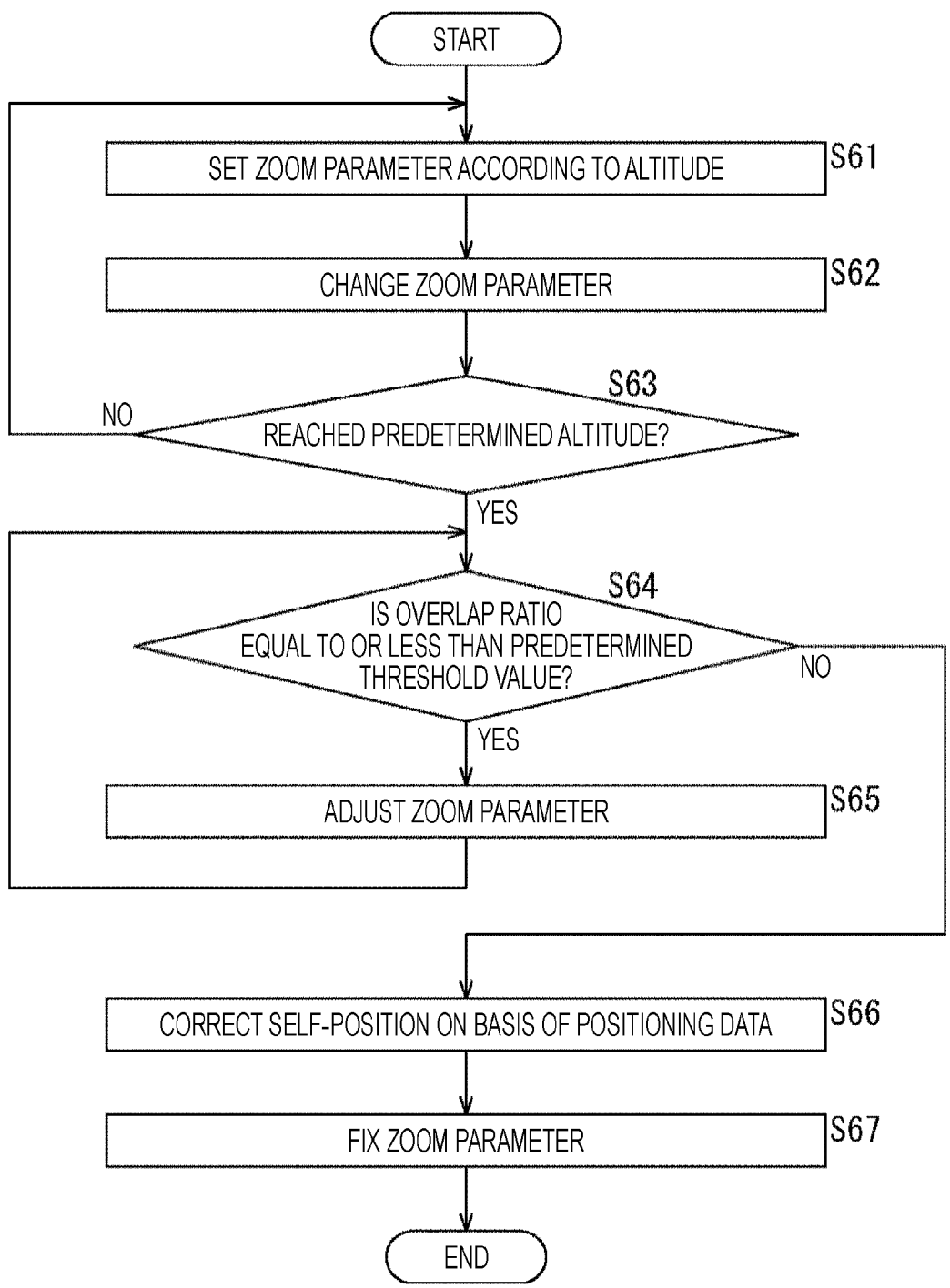
FIG. 16 is a flowchart for explaining a flow of zoom control processing.

FIG. 16 is a flowchart for describing zoom control processing of adjusting a zoom parameter according to an overlap ratio between frames of an image.

Note that since processing of steps S61 to S63, S66, S67 in the flowchart of FIG. 16 is similar to the processing of steps S31 to S35 in the flowchart of FIG. 8, description thereof will be omitted.

In other words, in step S64, the imaging control unit 72 determines whether or not an overlap ratio between frames of an image captured by the imaging unit 20 is equal to or less than a predetermined threshold value.

Figure 17:
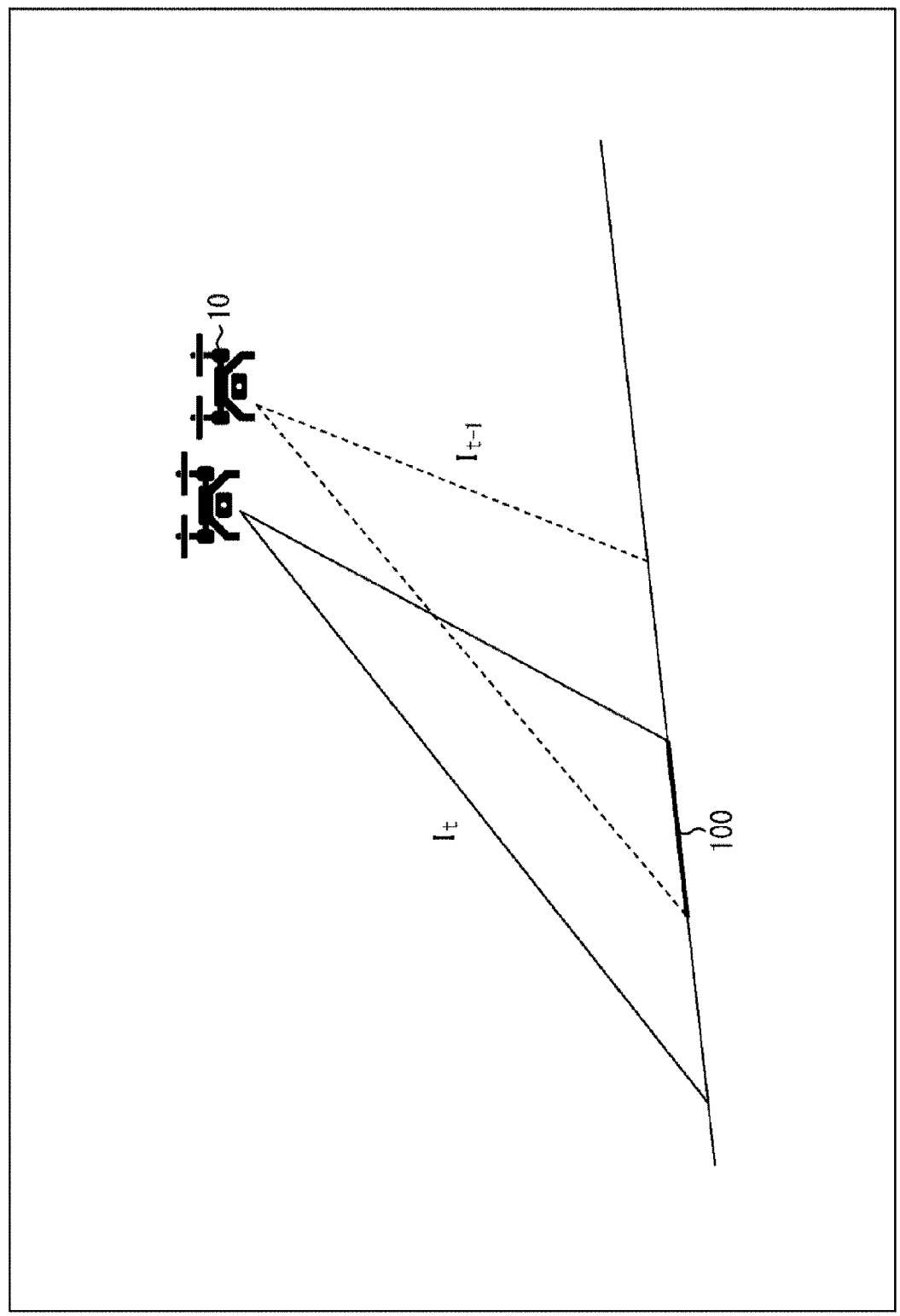
FIG. 17 is a diagram for explaining an overlap ratio.

Specifically, first, as illustrated in FIG. 17, matching between a frame $I_{t-1}$ at time t−1 and a frame $I_t$ at time t is performed.

Here, if $R(I_{t-1})$ is the number of pixels of a characteristic texture region on the frame $I_{t-1}$, and $R(I_t)$ is the number of pixels of a characteristic texture region on the frame $I_t$, an overlap ratio OLR is expressed by the following Formula (1).

[Mathematical formula 1]

$$OLR = \frac{(R(I_{t-1}) \cap R(I_t))}{(R(I_{t-1}))} \quad (1)$$

A denominator in the Formula (1) is the number of pixels of the texture region on the frame $I_{t-1}$, and a numerator in the Formula (1) is the number of pixels of a texture region 100 matched by matching between the frame $I_{t-1}$ and the frame $I_t$ in FIG. 17.

Note that the overlap ratio OLR may be expressed not only by using the number of pixels of the texture region matched between the frame $I_{t-1}$ and the frame $I_t$, but also by using the number of feature points matched between the frame $I_{t-1}$ and the frame $I_t$.

In a case where it is determined that the overlap ratio obtained in this manner is equal to or less than the predetermined threshold value, the processing proceeds to step S65, and the imaging control unit 72 adjusts the zoom parameter so as to increase the viewing angle. Thereafter, the processing returns to step S64, and step S65 is repeated until it is determined that the overlap ratio is not equal to or less than the predetermined threshold value.

Then, if it is determined that the overlap ratio is not equal to or less than the predetermined threshold value, step S65 is skipped, and the processing proceeds to step S66.

In this manner, the imaging control unit 72 further adjusts the zoom parameter according to the overlap ratio between the frames of the image captured by the imaging unit 20.

Therefore, since a common subject can be tracked between the frames, accuracy of self-position estimation can be maintained.

Note that, in the processing of FIGS. 15A and 15B, the zoom parameter is adjusted on the basis of the overlap ratio after the altitude change of the moving body 10. However, the zoom parameter may be adaptively adjusted according to an overlap ratio obtained during movement of the moving body 10. Of course, the zoom parameter may be adjusted on the basis of the overlap ratio after the zoom parameter is adjusted not only in accordance with the altitude of the moving body 10 but also in accordance with at least any one of the altitude or the moving speed thereof.

<7. Configuration of Moving Body Including Positioning Device>

Figure 18:
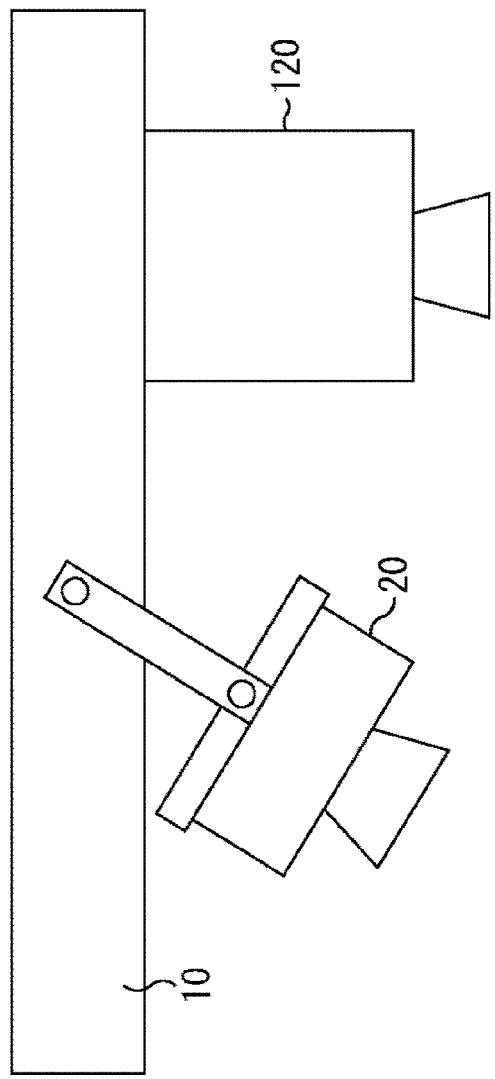
FIG. 18 is a diagram for explaining a configuration of the moving body further including a distance measuring device.

As illustrated in FIG. 18, a positioning device 120 may be mounted on the moving body 10 in addition to the imaging unit 20.

The positioning device 120 corresponds to the positioning sensor 52 in FIG. 4, and includes, for example, any of devices such as a single focus camera, a real time kinematic (RTK) positioning device, a GPS positioning device, and an inertial measurement unit (IMU), or a combination thereof.

Since the positioning device 120 is provided separately from the imaging unit 20 including the zoom lens 21, it is possible to perform highly accurate self-position estimation even at the time of taking off and landing of the moving body 10 and at the time of controlling a zoom parameter according to an altitude change.

(Flow of Processing During Self-Position Estimation)

Here, with reference to a flowchart of FIG. 19, a flow of processing during self-position estimation in the moving body 10 including the positioning device 120 will be described.

In step S71, it is determined whether or not zoom control processing by the imaging control unit 72 has been started. The processing does not proceed until it is determined that the zoom control processing has been started. If it is determined that the zoom control processing has been started, the processing proceeds to step S72.

In step S72, the self-position estimation unit 73 lowers reliability of self-position estimation using a zoom camera image that is an image captured by the imaging unit 20.

Thereafter, in step S73, it is determined whether or not the zoom control processing by the imaging control unit 72 has ended.

Step S73 is repeated until it is determined that the zoom control processing has ended. In other words, until the zoom control processing ends and the zoom parameter is fixed, the self-position estimation is performed in a state in which the reliability of the self-position estimation using the zoom camera image is lowered.

Then, if it is determined that the zoom control processing has ended, the processing proceeds to step S75.

In step S74, the self-position estimation unit 73 restores the reliability of the self-position estimation using the zoom camera image.

According to the above processing, while the zoom parameter changes, the self-position estimation is performed in a state in which the reliability of the self-position estimation using the zoom camera image is lowered. Thus, the self-position estimation can be accurately performed even while the altitude of the moving body 10 changes.

(Integration of Self-Position Estimation Results)

Figure 19:
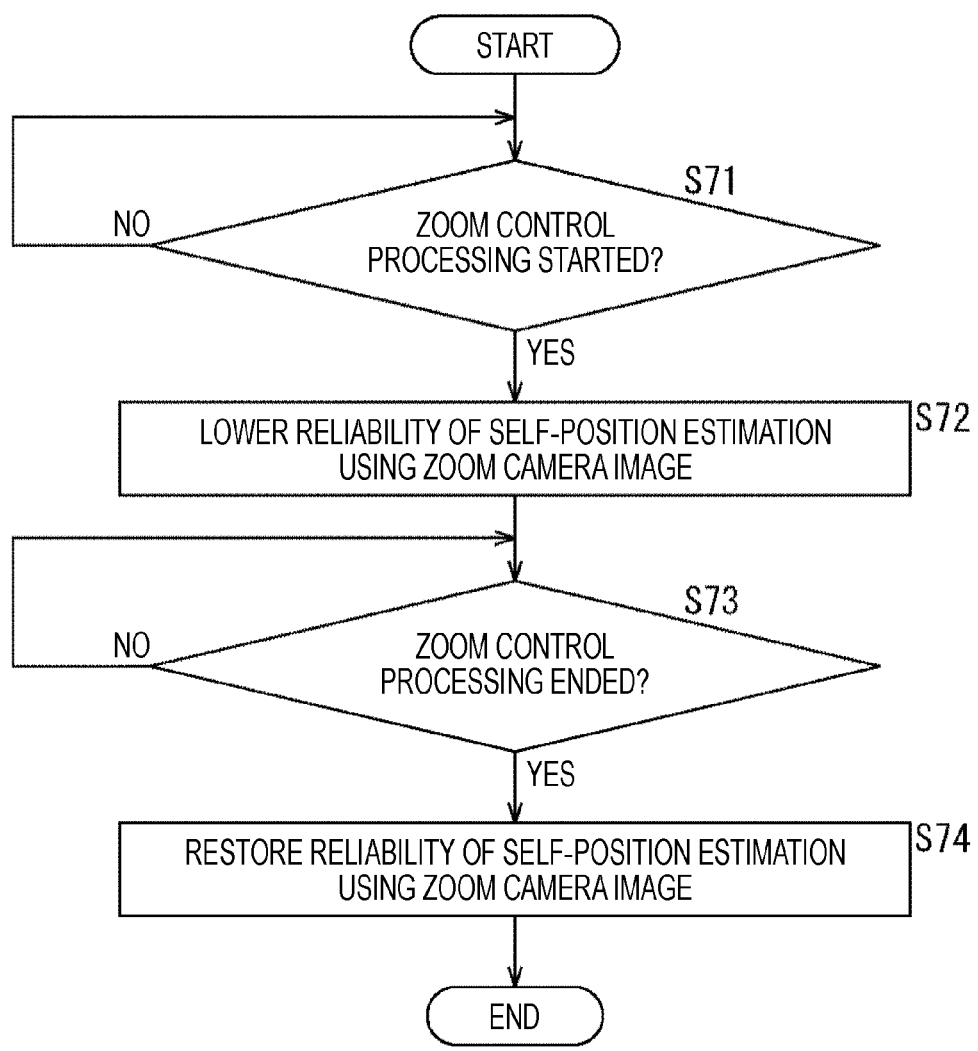
FIG. 19 is a flowchart for explaining a flow of processing while self-position estimation is performed.

In the processing of FIG. 19, in a case where the positioning device 120 includes a plurality of devices, self-position estimation results using output data of the devices may be integrated.

Figure 20A:
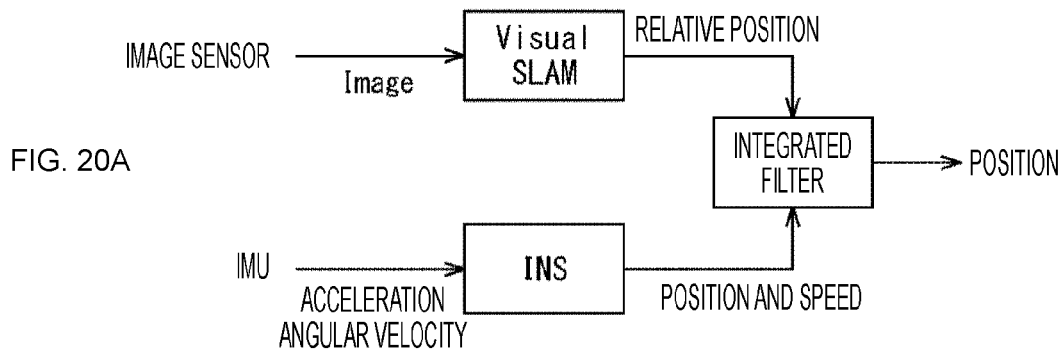
FIGS. 20A, 20B and 20C are diagrams for explaining integration of self-position estimation results.
Figure 20B:
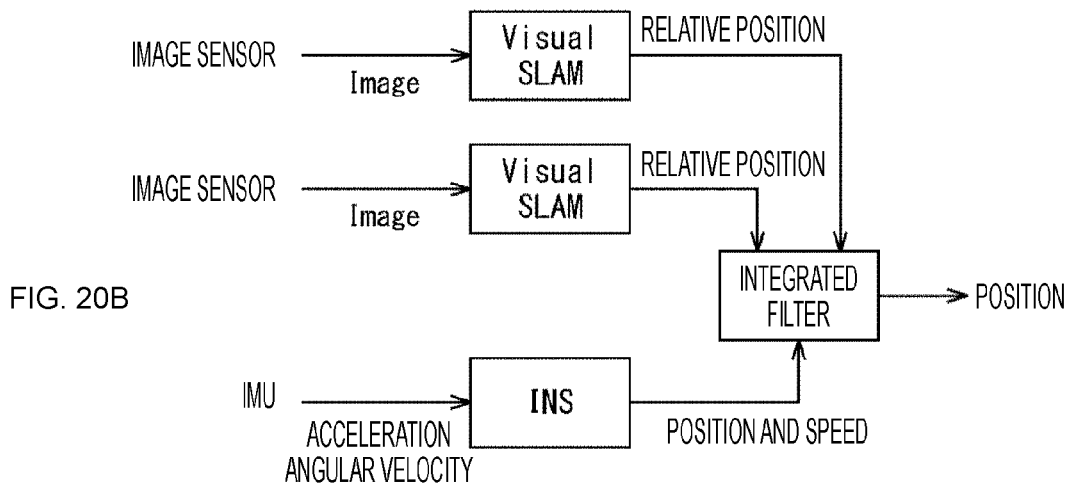
Figure 20C:
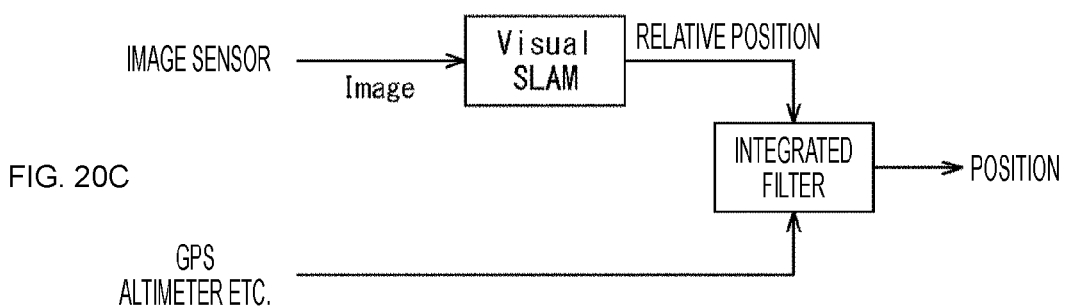

FIGS. 20A, 20B and 20C are diagrams for explaining integration of self-position estimation results using output data of a plurality of devices.

FIG. 20A illustrates a configuration in which a result of Visual SLAM using an image from an image sensor (single focus camera) and a position and a speed calculated by an inertial navigation system (INS) on the basis of acceleration and an angular velocity from the IMU are integrated.

In FIG. 20A, a relative position that is the result of Visual SLAM and the position and speed calculated by the INS are integrated by an integrated filter, whereby a self-position is estimated. For example, a Kalman filter can be used for the integrated filter.

FIG. 20B illustrates a configuration in which results of Visual SLAM using images from two image sensors and a position and a speed calculated by the INS on the basis of acceleration and an angular velocity from the IMU are integrated.

Also in FIG. 20B, relative positions that are the results of Visual SLAM and the position and speed calculated by the INS are integrated by the integrated filter, whereby a self-position is estimated.

FIG. 20C illustrates a configuration in which a result of Visual SLAM using an image from an image sensor and a position and an altitude measured by a GPS sensor and an altimeter are integrated.

In FIG. 20C, a relative position that is the result of Visual SLAM and the position and altitude measured by the GPS sensor and the altimeter are integrated by the integrated filter, whereby a self-position is estimated.

In this way, the self-position may be estimated by integrating the self-position estimation results using the output data of the plurality of devices.

Furthermore, the self-position estimation result using the image captured by the imaging unit 20 (with low reliability) and the self-position estimation result using the output data of the positioning device 120 may be integrated.

<8. Flow of Calibration>

In a camera including a zoom lens, it is necessary to calibrate a camera parameter in order to obtain an image with an accurate zoom magnification. Calibration of an internal parameter and an external parameter can be performed using, for example, a technique disclosed in Non-Patent Document: "A flexible new technique for camera calibration".

Hereinafter, a flow of calibration of a camera parameter of the imaging unit 20 mounted on the moving body 10 will be described.

(Calibration of Internal Parameter)

Figure 21:
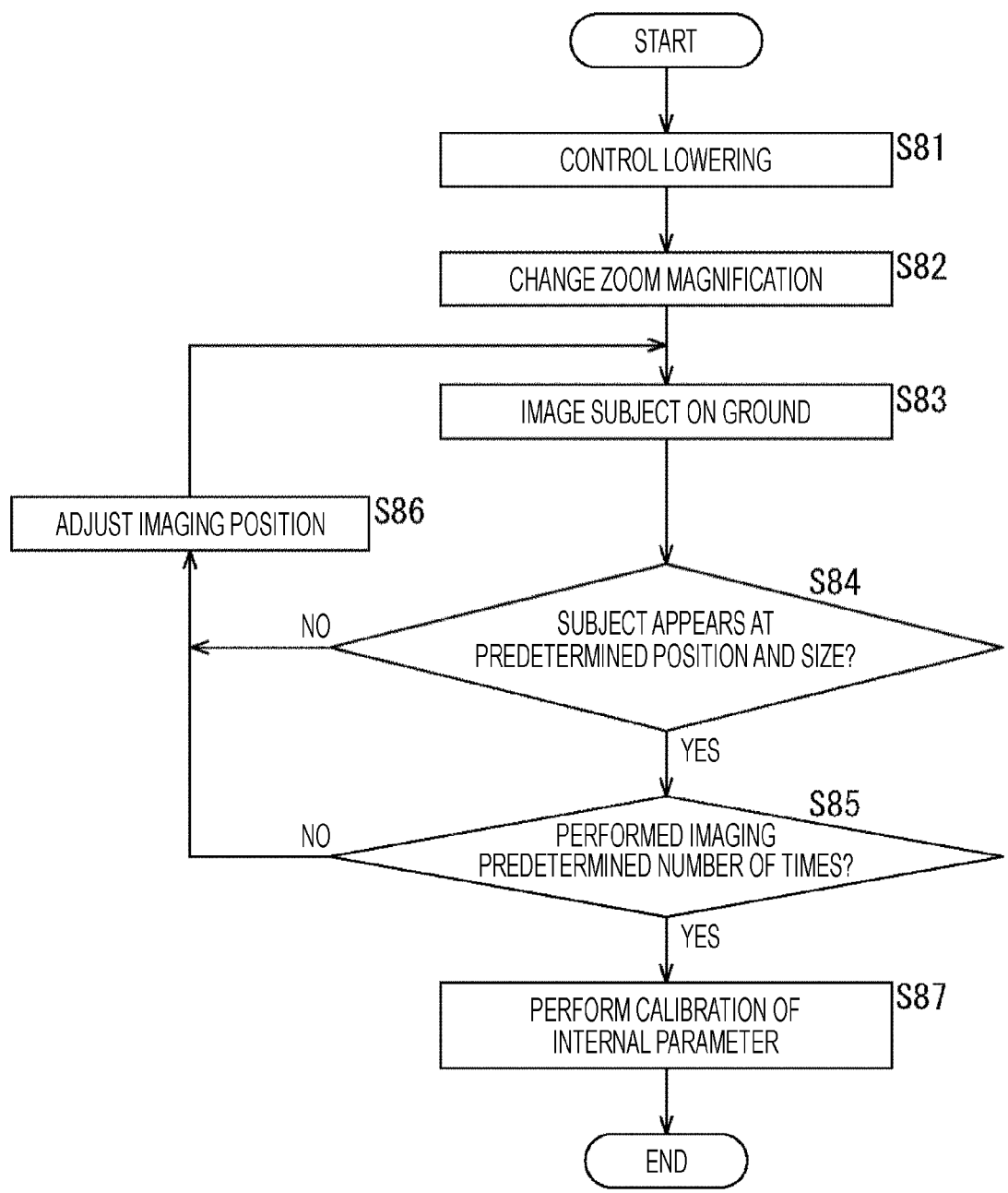
FIG. 21 is a flowchart for explaining a flow of calibration of an internal parameter.

FIG. 21 is a flowchart for explaining a flow of calibration of an internal parameter. Processing of FIG. 21 is executed, for example, when the flying moving body 10 reaches above a predetermined destination. On a ground surface of the destination, for example, a subject (such as a calibration board) on which a known pattern is drawn is disposed.

If the flying moving body 10 reaches above the destination, the drive control unit 71 controls the drive mechanism 54 to control lowering of the moving body 10 in step S81.

Figure 22:
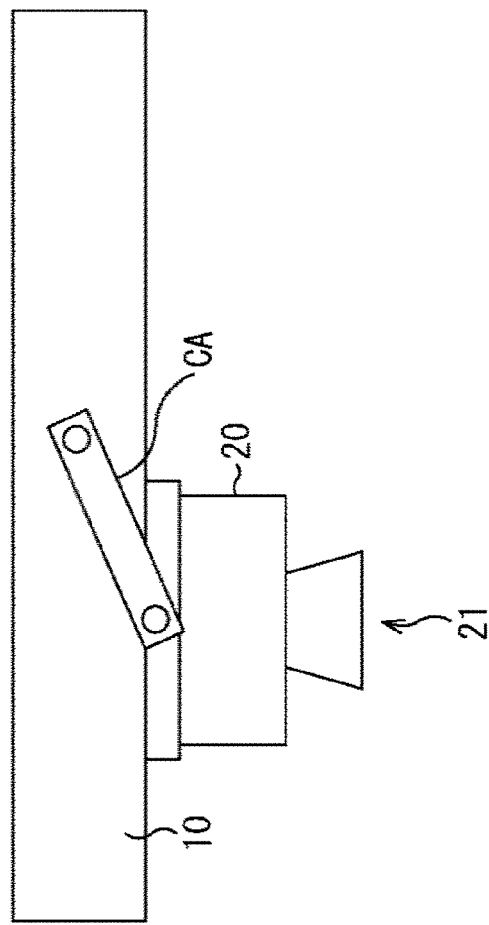
FIG. 22 is a diagram illustrating a posture of the imaging unit at the time of calibration.

At this time, as illustrated in FIG. 22, a posture of the imaging unit 20 is controlled by the arm CA such that the optical axis of the zoom lens 21 of the imaging unit 20 is fixed in the vertical direction (depression angle 90°).

In step S82, the imaging control unit 72 controls the zoom lens 21 to change the zoom magnification to a zoom magnification at which calibration is desired.

Moreover, in step S83, the imaging control unit 72 controls the imaging unit 20 to image the subject on the ground.

In step S84, it is determined whether or not the subject appears at a predetermined position and size.

If it is determined in step S84 that the subject appears at the predetermined position and size, the processing proceeds to step S85.

In step S85, it is determined whether or not the imaging unit 20 has imaged the subject on the ground a predetermined number of times.

On the other hand, in a case where it is determined in step S84 that the subject does not appear at the predetermined position and size, or in a case where it is determined in step S85 that the imaging unit 20 has not performed imaging the predetermined number of times, the processing proceeds to step S86, and an imaging position is adjusted.

For example, in a case where the subject does not appear at the predetermined position and size, an altitude of the moving body 10 is changed so that the subject appears at the predetermined position and size.

Furthermore, for example, in a case where the imaging unit 20 has not imaged the subject the predetermined number of times, positions and postures of the moving body 10 and the imaging unit 20 may be changed vertically and horizontally.

In this way, if the subject appears at the predetermined position and size and has been imaged the predetermined number of times by the imaging unit 20, the processing proceeds to step S86.

In step S86, the imaging control unit 72 calibrates the internal parameter using a plurality of images obtained by the predetermined number of times of imaging.

The above processing is executed for the zoom magnification at which the calibration is desired. Therefore, in a case where there is a plurality of zoom magnifications at which the calibration is desired, the processing of FIG. 21 is repeatedly executed for each zoom magnification.

Note that the processing of FIG. 21 is executed when the moving body 10 in flight reaches above the predetermined destination. However, the processing may be executed when the moving body 10 takes off from a departure place by arranging the subject on a ground surface of the departure place.

(Calibration of External Parameter Between Main Body of Moving Body and Imaging Unit)

Figure 23:
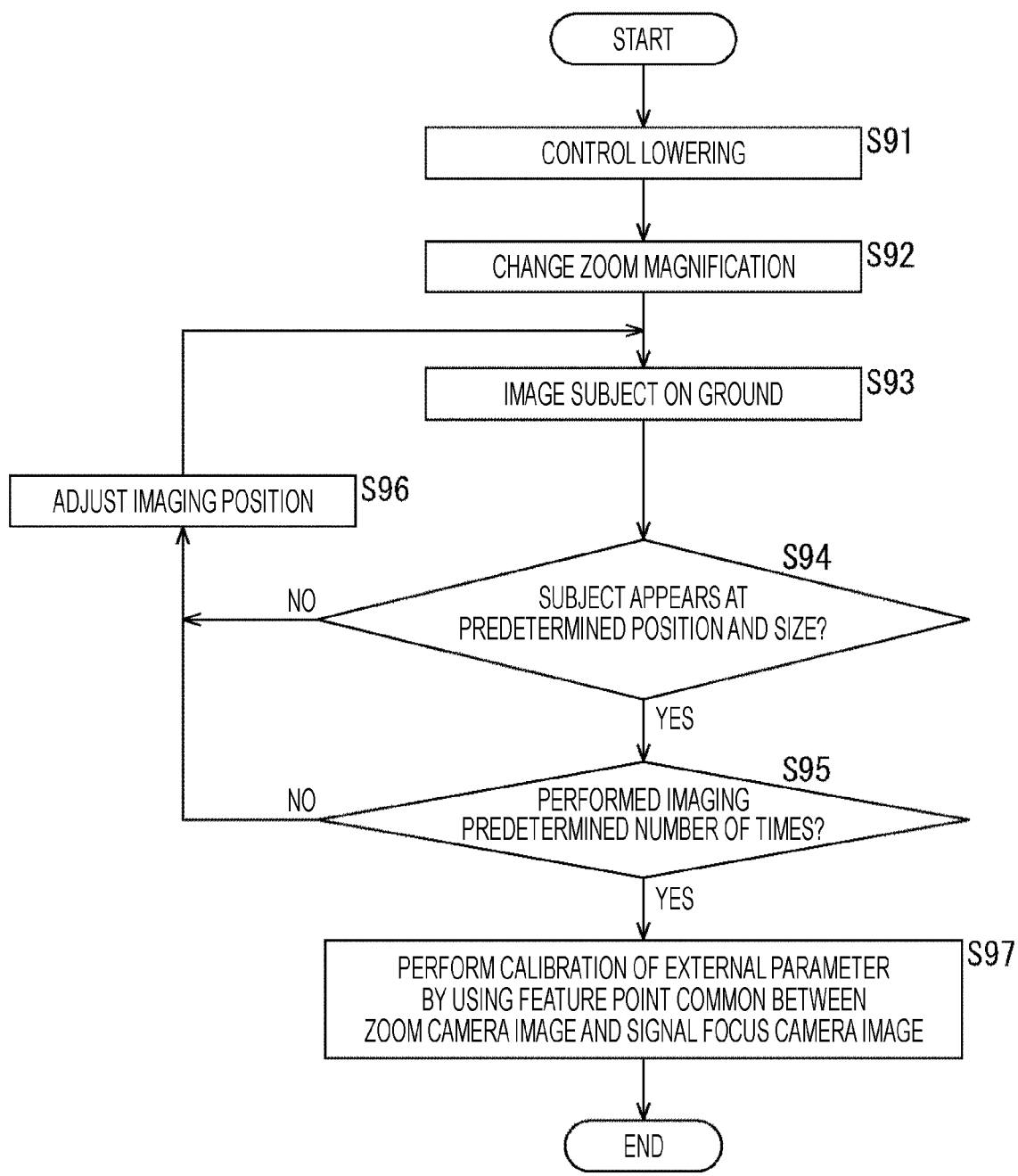
FIG. 23 is a flowchart for explaining a flow of calibration of an external parameter.

FIG. 23 is a flowchart for explaining a flow of calibration of an external parameter between the main body of the moving body 10 and the imaging unit 20. Processing of FIG. 23 is executed in a state in which the moving body 10 including the positioning device 120 described with reference to FIG. 18 moves, for example, above a take-off point (departure place) or a landing point (destination).

Furthermore, the processing of FIG. 23 may be executed in parallel with the calibration of the internal parameter of FIG. 21, or may be executed separately from the calibration of the internal parameter of FIG. 21.

Note that the processing in steps S91 to S96 in FIG. 23 is basically similar to the processing in steps S81 to S86 in FIG. 21, and thus description thereof will be omitted.

The optical axis of the zoom lens 21 of the imaging unit 20 may be fixed in the vertical direction (depression angle 90°) or may be fixed in an arbitrary direction.

The external parameter includes a deviation of the optical axis inside the imaging unit 20 including the zoom lens 21 and a deviation of inclination of the arm CA. In a case where the deviation of the inclination of the arm CA is small, the optical axis of the zoom lens 21 is fixed in the vertical direction (depression angle 90°) by the arm CA, and calibration of only the deviation of the optical axis inside the imaging unit 20 due to aging deterioration can be executed.

In other words, in step S97, the imaging control unit 72 calibrates the external parameter by using a feature point common between a zoom camera image captured by the imaging unit 20 and a single focus camera image captured by the single focus camera constituting the positioning device 120.

Figure 24:
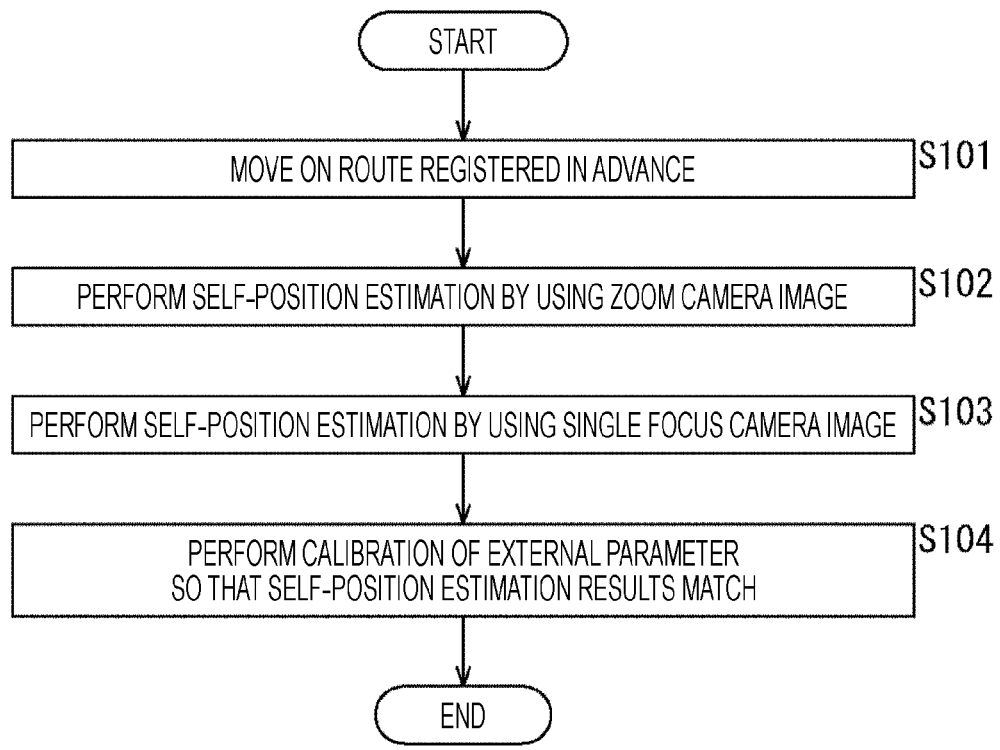
FIG. 24 is a flowchart for explaining a flow of calibration of the external parameter.

The calibration of the external parameter may be performed according to a flowchart illustrated in FIG. 24.

Processing of FIG. 24 is also executed in a state in which the moving body 10 including the positioning device 120 moves above the take-off point or the landing point.

In step S101, the drive control unit 71 controls the drive mechanism 54 to control movement of the moving body 10 so as to move on a route registered in advance (perform optimum movement for executing the calibration of the external parameter).

In step S102, the self-position estimation unit 73 performs self-position estimation using a zoom camera image captured by the imaging unit 20.

In parallel with this, in step S103, the self-position estimation unit 73 performs self-position estimation using a single focus camera image captured by the single focus camera constituting the positioning device 120.

Then, in step S104, the imaging control unit 72 calibrates the external parameter so that a self-position estimation result using the zoom camera image matches a self-position estimation result using the single focus camera image. Specifically, the imaging control unit 72 performs calibration of the external parameter by solving an optimization problem using the external parameter as a variable.

Note that, as illustrated in FIG. 3, in a case where the imaging unit 20 is connected with the moving body 10 via the gimbal GB, a posture of the imaging unit 20 is kept constant, and thus a relative positional relationship between the zoom lens 21 and the single focus camera (positioning device 120) is not kept constant. In this case, a fine posture change of the moving body 10 is performed by the single focus camera, and a relative posture with respect to the imaging unit 20 is obtained from the posture as needed.

In particular, the external parameter affects an integration result obtained by integrating the self-position estimation result using the zoom camera image captured by the imaging unit 20 and the self-position estimation result using the single focus camera captured by the single focus camera.

Specifically, in a case where the zoom magnification of the zoom lens 21 is changed in the imaging unit 20, there is a possibility that a slight deviation such as 0.01°, for example, occurs in the optical axis. In this state, in a case where the self-position estimation result using the zoom camera image and the self-position estimation result using the single focus camera are integrated, estimated position and posture of the imaging unit 20 are deviated by, for example, 0.01° each.

On the other hand, since the external parameter is calibrated in the moving body 10 according to the present technology, even in a case where a change occurs in the camera parameter, maintenance thereof can be periodically performed, and a state of performing highly accurate self-position estimation can be maintained.

<9. Configuration of Control System of Moving Body>

In the above description, the control unit 51 of the moving body 10 controls the zoom parameter of the imaging unit 20 to perform the self-position estimation. The present invention is not limited thereto, and an external computer that controls the moving body 10 may control the zoom parameter of the imaging unit 20 to estimate the position of the moving body 10.

Figure 25:
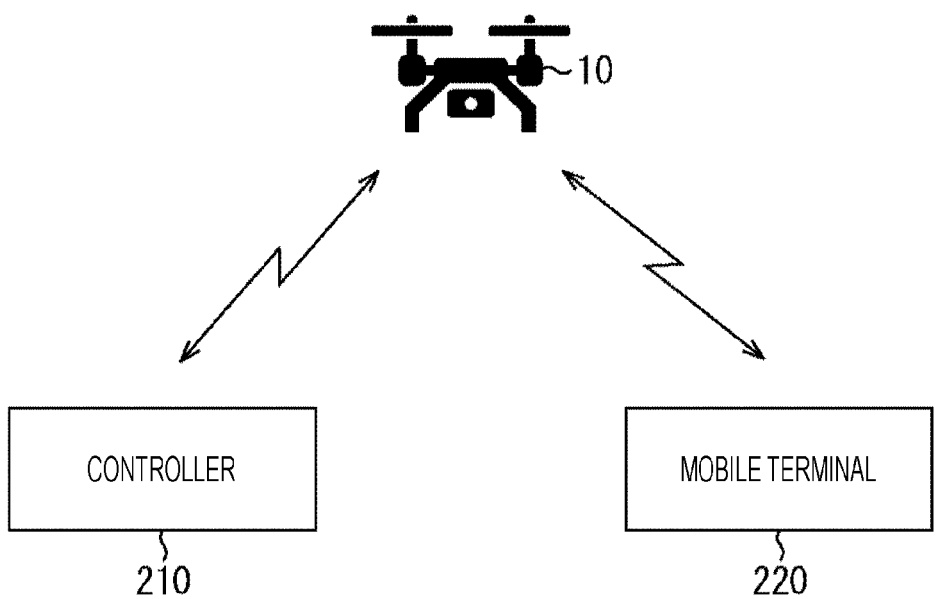
FIG. 25 is a diagram illustrating a configuration example of a control system of the moving body.

FIG. 25 is a diagram illustrating a configuration example of a control system of the moving body 10.

In FIG. 25, the moving body 10 performs wireless communication with a controller 210 and a mobile terminal 220 for operating the moving body 10.

The controller 210 and the mobile terminal 220 each include a control unit having a function similar to that of the control unit 51, set a zoom parameter of the imaging unit 20 according to at least any one of an altitude or a moving speed of the moving body 10, and estimate a self-position on the basis of an image from the imaging unit 20.

FIG. 25 is a block diagram showing a configuration example of hardware of a computer.

The controller 210 and the mobile terminal 220 described above are realized by the computer having the configuration illustrated in FIG. 25.

A CPU 1001, a ROM 1002, and a RAM 1003 are connected to one another by a bus 1004.

Moreover, an input/output interface 1005 is connected to the bus 1004. An input unit 1006 including a keyboard, a mouse, and the like, and an output unit 1007 including a display, a speaker, and the like are connected to the input/output interface 1005. Furthermore, a storage unit 1008 including a hard disk, a nonvolatile memory, or the like, a communication unit 1009 including a network interface or the like, and a drive 310 that drives a removable medium 1011 are connected to the input/output interface 1005.

In the computer configured as described above, for example, the CPU 1001 loads a program stored in the storage unit 1008 into the RAM 1003 via the input/output interface 1005 and the bus 1004 and executes the program, whereby the above-described series of processing is performed.

The program executed by the CPU 1001 is provided, for example, by being recorded in the removable medium 311 or via a wired or wireless transmission medium such as a local area network, the Internet, or digital broadcasting, and is installed in the storage unit 1008.

Note that the program executed by the computer may be a program in which processing is performed in time series in the order described in the present specification, or may be a program in which processing is performed in parallel or at necessary timing such as when a call is made, and the like.

Note that an embodiment of the technology according to the present disclosure is not limited to the above-described embodiment, and various modifications can be made without departing from the scope of the technology according to the present disclosure.

Furthermore, the effects described in the present specification are merely examples and are not limited, and there may be other effects.

Moreover, the technology according to the present disclosure can have the following configurations.

(1)

A moving body including:

an imaging unit having a zoom lens;

an imaging control unit that sets a zoom parameter of the imaging unit according to at least any one of an altitude or a moving speed of its own machine; and a self-position estimation unit that estimates a self-position on the basis of an image captured by the imaging unit in which the zoom parameter is set.

(2)

The moving body according to (1), in which the imaging control unit changes the zoom parameter so that a viewing angle decreases as the altitude of the own machine increases.

(3)

The moving body according to (1), in which the imaging control unit adjusts the zoom parameter so that the viewing angle increases as the moving speed of the own machine increases.

(4)

The moving body according to any one of (1) to (3), in which the imaging control unit adjusts the zoom parameter according to an index value of disparity of a feature point on the image captured by the imaging unit.

(5)

The moving body according to (4), in which the imaging control unit adjusts the zoom parameter so that an average value of the disparity of a plurality of the feature points becomes a value within a certain range.

(6)

The moving body according to (4), in which the imaging control unit adjusts the zoom parameter so that a representative value of the disparity of a plurality of the feature points becomes a value within a certain range.

(7)

The moving body according to any one of (4) to (6), in which the imaging unit includes a monocular camera, and the imaging control unit adjusts the zoom parameter according to the index value between different frames.

(8)

The moving body according to any one of (4) to (6), in which the imaging unit includes a stereo camera, and the imaging control unit adjusts the zoom parameter according to the index value between stereo images.

(9)

The moving body according to any one of (1) to (3), in which the imaging control unit adjusts the zoom parameter according to an overlap ratio between frames of the image captured by the imaging unit.

(10)

The moving body according to (9), in which the imaging control unit adjusts the zoom parameter so as to increase the viewing angle in a case where the overlap ratio is equal to or less than a predetermined threshold value.

(11)

The moving body according to (9) or (10), in which the overlap ratio is expressed by using the number of pixels of a texture region matched between the frames.

(12)

The moving body according to (9) or (10), in which the overlap ratio is expressed by using the number of feature points matched between the frames.

(13)

The moving body according to any one of (1) to (12), further including:

a positioning device different from the imaging unit, in which the self-position estimation unit estimates the self-position by using a positioning result obtained by the positioning device while the zoom parameter changes.

(14)

The moving body according to (13), in which the self-position estimation unit estimates the self-position by integrating self-position estimation results using the positioning results obtained by a plurality of the positioning devices.

(15)

The moving body according to (1) to (14), in which the zoom parameter includes a drive control value of the zoom lens.

(16)

The moving body according to (1) to (15), in which the zoom parameter includes an internal parameter and an external parameter of the imaging unit.

(17)

The moving body according to (16), in which the internal parameter includes a distortion coefficient of the zoom lens.

(18)

A position estimation method including:

setting a zoom parameter of an imaging unit according to at least any one of an altitude or a moving speed of a moving body including the imaging unit having a zoom lens; and estimating a position of the moving body on the basis of an image captured by the imaging unit in which the zoom parameter is set.

(19)

A program for causing a processor to execute processing of:

setting a zoom parameter of an imaging unit according to at least any one of an altitude or a moving speed of a moving body including the imaging unit having a zoom lens; and estimating a position of the moving body on the basis of an image captured by the imaging unit in which the zoom parameter is set.

REFERENCE SIGNS LIST

10 Moving body
20 Imaging unit
21 Zoom lens
51 Control unit
52 Positioning sensor
53 Communication unit
54 Drive mechanism
55 Storage unit
71 Drive control unit
72 Imaging control unit
73 Self-position estimation unit
120 Positioning device

The invention claimed is:

1. A moving body, comprising:
an imaging unit that includes a zoom lens;
an imaging control unit configured to:
set a zoom parameter of the imaging unit based on at least one of an altitude or a moving speed of the moving body; and
adjust the zoom parameter based on an index value of disparity of a plurality of feature points on an image captured by the imaging unit, wherein the zoom parameter is adjusted so that an average value of the disparity of the plurality of feature points becomes a value within a specific range; and
a self-position estimation unit configured to estimate a position of the moving body based on the image captured by the imaging unit in which the zoom parameter is set.

2. The moving body according to claim 1,
wherein the imaging control unit is further configured to change the zoom parameter so that a viewing angle decreases as the altitude of the moving body increases.

3. The moving body according to claim 1,
wherein the imaging control unit is further configured to adjust the zoom parameter so that a viewing angle increases as the moving speed of the moving body increases.

4. The moving body according to claim 1,
wherein the imaging control unit is further configured to adjust the zoom parameter so that a representative value of the disparity of the plurality of feature points becomes a value within the specific range.

5. The moving body according to claim 1, wherein
the imaging unit includes a monocular camera, and
the imaging control unit is further configured to adjust the zoom parameter based on an index value between different frames.

6. The moving body according to claim 1, wherein
the imaging unit includes a stereo camera, and
the imaging control unit is further configured to adjust the zoom parameter based on an index value between stereo images.

7. The moving body according to claim 1, wherein the imaging control unit is further configured to adjust the zoom parameter based on an overlap ratio between frames of the image captured by the imaging unit.

8. The moving body according to claim 7,
wherein the imaging control unit is further configured to adjust the zoom parameter so as to increase a viewing angle in a case where the overlap ratio is equal to or less than a specific threshold value.

9. The moving body according to claim 7,
wherein the overlap ratio is expressed by using a number of pixels of a texture region matched between the frames.

10. The moving body according to claim 7,
wherein the overlap ratio is expressed by using a number of feature points matched between the frames.

11. The moving body according to claim 1, further comprising:
a positioning device different from the imaging unit,
wherein the self-position estimation unit is further configured to estimate the position based on a positioning result obtained by the positioning device while the zoom parameter changes.

12. The moving body according to claim 11,
wherein the self-position estimation unit is further configured to estimate the position by integrating self-position estimation results using positioning results obtained by a plurality of positioning devices.

13. The moving body according to claim 1,
wherein the zoom parameter includes a drive control value of the zoom lens.

14. The moving body according to claim 1,
wherein the zoom parameter includes an internal parameter and an external parameter of the imaging unit.

15. The moving body according to claim 14,
wherein the internal parameter includes a distortion coefficient of the zoom lens.

16. A position estimation method, comprising:
setting a zoom parameter of an imaging unit based on at least one of an altitude or a moving speed of a moving body including the imaging unit having a zoom lens;
adjusting the zoom parameter based on an index value of disparity of a plurality of feature points on an image captured by the imaging unit, wherein the zoom parameter is adjusted so that an average value of the disparity of the plurality of feature points becomes a value within a specific range; and
estimating a position of the moving body based on the image captured by the imaging unit in which the zoom parameter is set.

17. A non-transitory computer readable medium having stored thereon computer-executable instructions, which when executed by a computer, cause the computer to execute operations, the operations comprising:
setting a zoom parameter of an imaging unit based on at least one of an altitude or a moving speed of a moving body including the imaging unit having a zoom lens;
adjusting the zoom parameter based on an index value of disparity of a plurality of feature points on an image captured by the imaging unit, wherein the zoom parameter is adjusted so that an average value of the disparity of the feature points becomes a value within a specific range; and
estimating a position of the moving body based on the image captured by the imaging unit in which the zoom parameter is set.

18. A moving body, comprising:
an imaging unit that includes a zoom lens;
an imaging control unit configured to:
set a zoom parameter of the imaging unit based on at least one of an altitude or a moving speed of the moving body; and
adjust the zoom parameter based on an overlap ratio between frames of an image captured by the imaging unit; and a self-position estimation unit configured to estimate a position of the moving body based on the image captured by the imaging unit in which the zoom parameter is set.

* * * * *